(12) United States Patent
Weber

(10) Patent No.: US 11,041,233 B2
(45) Date of Patent: Jun. 22, 2021

(54) COPPER-NICKEL-TIN ALLOY, METHOD FOR THE PRODUCTION AND USE THEREOF

(71) Applicant: WIELAND-WERKE AG, Ulm (DE)

(72) Inventor: Kai Weber, Bellenberg (DE)

(73) Assignee: WIELAND-WERKE AG, Ulm (DE)

( * ) Notice: Subject to any disclaimer, the term of this patent is extended or adjusted under 35 U.S.C. 154(b) by 245 days.

(21) Appl. No.: 16/309,701

(22) PCT Filed: Jun. 27, 2017

(86) PCT No.: PCT/EP2017/000758
§ 371 (c)(1),
(2) Date: Dec. 13, 2018

(87) PCT Pub. No.: WO2018/014993
PCT Pub. Date: Jan. 25, 2018

(65) Prior Publication Data
US 2019/0136357 A1    May 9, 2019

(51) Int. Cl.
| | |
|---|---|
| *C22C 9/02* | (2006.01) |
| *C22C 9/06* | (2006.01) |
| *C22F 1/08* | (2006.01) |
| *C22C 9/10* | (2006.01) |
| *C21D 7/13* | (2006.01) |
| *C21D 7/02* | (2006.01) |

(52) U.S. Cl.
CPC .................. *C22F 1/08* (2013.01); *C21D 7/02* (2013.01); *C21D 7/13* (2013.01); *C22C 9/02* (2013.01); *C22C 9/06* (2013.01); *C22C 9/10* (2013.01); *Y02P 10/20* (2015.11)

(58) Field of Classification Search
CPC ..... C22C 9/06; C22C 9/02; C22C 9/04; C22F 1/08
See application file for complete search history.

(56) References Cited

U.S. PATENT DOCUMENTS

| | | |
|---|---|---|
| 2,129,197 A | 9/1938 | Bryant |
| 3,392,017 A | 7/1968 | Quaas et al. |
| 4,090,890 A | 5/1978 | Plewes |
| 4,818,307 A | 4/1989 | Mori et al. |
| 5,004,581 A | 4/1991 | Takagi et al. |
| 5,021,105 A | 6/1991 | Asai et al. |
| 5,028,282 A | 7/1991 | Kubozono et al. |
| 5,041,176 A | 8/1991 | Mikawa |
| 5,064,611 A | 11/1991 | Hashizume et al. |
| 6,379,478 B1 | 4/2002 | Farquharson et al. |
| 6,716,292 B2 | 4/2004 | Nielsen, Jr. et al. |
| 2013/0022492 A1* | 1/2013 | Kuwagaki ............. H01B 1/026 420/473 |

FOREIGN PATENT DOCUMENTS

| | | |
|---|---|---|
| DE | 2 033 744 A1 | 12/1971 |
| DE | 23 50 389 C2 | 4/1974 |
| DE | 24 40 010 B2 | 3/1975 |
| DE | 37 25 830 A1 | 3/1988 |
| DE | 41 01 912 A1 | 10/1991 |
| DE | 41 26 079 C2 | 2/1993 |
| DE | 691 05 805 T2 | 7/1995 |
| DE | 0 833 954 T1 | 10/1998 |
| DE | 102 08 635 B4 | 9/2003 |
| DE | 10 2010 055 055 B3 | 5/2012 |
| DE | 10 2012 105 089 A1 | 12/2012 |
| EP | 2 241 643 A1 | 10/2010 |
| KR | 1020020008710 A | 1/2002 |

OTHER PUBLICATIONS

International Search Report issued in International Application No. PCT/EP2017/000758 with English translation dated Oct. 5, 2017 (5 pages).
Written Opinion of International Searching Authority issued in International Application No. PCT/EP2017/000758 dated Oct. 5, 2017 (8 pages).
Office Action of German Patent Office issued in German Application No. 10 2016 008 758.7 dated Jun. 23, 2017 (6 pages).
Article by O. Knotek, et al., Ein Beitrag zur Beurteilung verschleissfester Nickel-Bor-Silicium-Hartlegierungen, Z. Werkstofftech. 8, pp. 331-335 (1977).
Article by E. Lugscheider, et al., Das Dreistoffsystem Nickel-Bor-Silicium, Monatshefte für Chemie 106 (1975) pp. 1155-1165.
U.S. Appl. No. 16/308,204, filed Dec. 7, 2018.
U.S. Appl. No. 16/308,683, filed Dec. 10, 2018.
U.S. Appl. No. 16/308,893, filed Dec. 11, 2018.
U.S. Appl. No. 16/309,143, filed Dec. 12, 2018.

* cited by examiner

*Primary Examiner* — Jessee R Roe
(74) *Attorney, Agent, or Firm* — Flynn Thiel, P.C.

(57) ABSTRACT

A copper-nickel-tin alloy with excellent castability, hot workability and cold workability, high resistance to abrasive wear, adhesive wear and fretting wear and improved resistance to corrosion and stress relaxation stability, consisting of (in weight %): 2.0-10.0% Ni, 2.0-10.0% Sn, 0.01-1.0% Fe, 0.01-0.8% Mg, 0.01-2.5% Zn, 0.01-1.5% Si, 0.002-0.45% B, 0.004-0.3% P, selectively up to a maximum of 2.0% Co, selectively up to a maximum of 0.25% Pb, the residue being copper and unavoidable impurities. The ratio Si/B of the element-contents in wt. % of the elements silicon and boron is a minimum 0.4 and a maximum 8 such that the copper-nickel-tin alloy has Si-containing and B-containing phases, phases of the systems Ni—Si—B, Ni—B, Fe—B, Ni—P, Fe—P, Mg—P, Ni—Si, and Mg—Si, and other Fe-containing phases and Mg-containing phases.

24 Claims, 4 Drawing Sheets

COPPER-NICKEL-TIN ALLOY, METHOD FOR THE PRODUCTION AND USE THEREOF

The invention relates to a copper-nickel-tin alloy having an excellent castability, hot formability and cold formability, high resistance to abrasive wear, adhesive wear and fretting wear, and an improved corrosion resistance and stress relaxation resistance, to a process for production thereof, and to the use thereof.

Due to their good strength properties and their good corrosion resistance and conductivity for heat and electrical current, the binary copper/tin alloys have great significance in mechanical engineering and motor vehicle construction, and in large parts of electronics and electrical engineering.

This group of materials has a high resistance to abrasive wear. Moreover, the copper/tin alloys assure good sliding properties and a high fatigue endurance, which results in their excellent suitability for sliding elements in engine construction and motor vehicle construction, and in mechanical engineering in general.

By comparison with the binary copper/tin materials, the copper-nickel-tin alloys have improved mechanical properties such as hardness, tensile strength and yield point. The increase in the mechanical indices is achieved here via the hardenability of the Cu—Ni—Sn alloys.

As well as the importance of the ratio of the elements nickel and tin for the temperature at which there is a spontaneous spinodal segregation in the Cu—Ni—Sn alloys, the precipitation processes are essential for the establishment of the properties of this group of materials.

In the literature, the presence of discontinuous precipitates particularly at the particle boundaries of the microstructure of the Cu—Ni—Sn alloys is associated with a deterioration in toughness properties under dynamic stress.

For instance, publication DE 0 833 954 T1 proposes producing a spinodal Cu—Ni—Sn strand-casting alloy with 8% to 16% by weight of Ni, 5% to 8% by weight of Sn and optionally with up to 0.3% by weight of Mn, up to 0.3% by weight of B, up to 0.3% by weight of Zr, up to 0.3% by weight of Fe, up to 0.3% by weight of Nb and up to 0.3% by weight of Mg without any processing by kneading. After the performance of a solution annealing treatment of the cast state and after spinodal aging, the alloy has to be cooled rapidly in each case by means of water quenching in order to obtain a spinodally segregated microstructure without discontinuous precipitates.

By contrast, publication DE 23 50 389 C, with regard to a Cu—Ni—Sn alloy having 2% to 98% by weight of Ni and 2% to 20% by weight of Sn, states that cold forming with at least one degree of forming of ε=75% has to be conducted in order to be able to prevent the occurrence of embrittling discontinuous precipitates during age annealing.

Document DE 691 05 805 T2 mentions the difficulties that occur in the industrial large-scale production of semifinished products and components from the copper-nickel-tin alloys. For instance, the occurrence of Sn-rich segregations, particularly at the grain boundaries of the cast microstructure, greatly restricts the opportunity for further economical processing. The Sn-rich segregations, which cannot be easily eliminated even by means of a thermomechanical processing operation on the cast state of the Cu—Ni—Sn alloys, prevent homogeneous distribution of the alloy elements in the matrix. However, this is a fundamental prerequisite for the hardenability of this group of materials. What is therefore proposed is to finely atomize the melt of a copper alloy with 4% to 18% by weight of Ni and 3% to 13% by weight of Sn, and to collect the spray particles on a collection surface. Subsequent rapid cooling is intended to counteract the formation of the Sn-rich grain boundary segregations.

Document DE 41 26 079 C2 discloses that a number of copper alloys can be produced by the conventional method of block casting with subsequent hot forming, cold forming and intermediate annealing operations only with poor economic viability, if at all, because hot forming is difficult due to grain boundary precipitates, segregations or other inhomogeneities.

These copper alloys also include the copper-nickel-tin materials. To assure cold forming of the cast state of such alloys, therefore, a thin strip casting method with exact control of the solidification rate of the melt is recommended.

As a result of rising operating temperatures and pressures in modern engines, machines, installations and aggregates, a wide variety of different mechanisms of damage to the individual system elements occurs. Thus, there is an ever greater necessity, especially in the case of the design of sliding elements and plug connectors from the point of view of materials and construction, to take account not only of the types of sliding wear but also of the mechanism of damage by oscillating friction wear.

Oscillating friction wear, also called fretting, is a kind of friction wear that occurs between oscillating contact faces. In addition to the geometry wear or volume wear of the components, the reaction with the surrounding medium results in friction corrosion. The damage to the material can distinctly lower local strength in the wear zone, especially fatigue strength. Fatigue cracks can travel from the damaged component surface, and these lead to fatigue fracture/fatigue failure. Under friction corrosion, the fatigue strength of a component can drop well below the fatigue index of the material.

In one sense, the mechanism of oscillating friction wear differs considerably from the types of sliding wear with respect to movement. More particularly, the effects of corrosion are particularly marked in the case of oscillating friction wear.

Document DE 10 2012 105 089 A1 describes the consequences of damage caused by oscillating friction wear of slide bearings. To assure a stable position of the slide bearings, they are indented into the bearing seat. The indenting operation creates a high stress on the slide bearing, which is even further increased by the increasing stresses, thermal expansions, and dynamic shaft loads in modern engines. As a result of the excessive stress, changes in geometry of the slide bearing can occur, which reduces the original bearing overlap. This enables micro-movements of the slide bearing relative to the bearing seat. These cyclical relative movements with a low oscillation width at the contact faces between the bearing and bearing seat lead to oscillating friction wear/friction corrosion/fretting of the backing of the slide bearing. The consequence is the initiation of cracks and ultimately the friction fatigue failure of the slide bearing.

The results of fretting tests with various slide bearing materials suggest that particularly Cu—Ni—Sn alloys with a Ni content above 2% by weight, as is the case in the spinodally hardening copper-nickel-tin alloys, have inadequate resistance to fretting wear.

In engines and machines, electrical plug connectors are frequently disposed in an environment in which they are subjected to mechanical oscillating vibrations. If the elements of a connection arrangement are present in different assemblies that perform movements relative to one another as a result of mechanical stresses, the result can be corresponding relative movement of the connection elements. These relative movements lead to oscillating friction wear and to friction corrosion of the contact zone of the plug connectors. Microcracks form in this contact zone, which greatly reduces the fatigue resistance of the plug connector material. Failure of the plug connector through fatigue failure can be the consequence. Moreover, due to the friction corrosion, there is a rise in the contact resistance.

Accordingly, a crucial factor for sufficient resistance to oscillating friction wear/friction corrosion/fretting is a combination of the material properties of wear resistance, ductility and corrosion resistance.

In order to increase the wear resistance of the copper-nickel-tin alloys, it is necessary to add suitable wear substrates to these materials. These wear substrates in the form of hard particles are intended to assume the function of protection from the consequences of abrasive and adhesive wear. Useful hard particles in the Cu—Ni—Sn alloys include various forms of precipitation.

Document U.S. Pat. No. 6,379,478 B1 discloses the teaching of a copper alloy for plug connectors with 0.4% to 3.0% by weight of Ni, 1% to 11% by weight of Sn, 0.1% to 1% by weight of Si and 0.01% to 0.06% by weight of P. The fine precipitates of the nickel silicides and nickel phosphides are said to assure the high strength and good stress relaxation resistance of the alloy.

For production of a sliding layer on a steel base substrate, document U.S. Pat. No. 2,129,197 A names a copper alloy which is applied by application welding to the base substrate and contains 77% to 92% by weight of Cu, 8% to 18% by weight of Sn, 1% to 5% by weight of Ni, 0.5% to 3% by weight of Si and 0.25% to 1% by weight of Fe. Wear substrates used here are described as the silicides and phosphides of the alloy elements nickel and iron.

Document U.S. Pat. No. 3,392,017 A discloses a low-melting copper alloy having up to 0.4% by weight of Si, 1% to 10% by weight of Ni, 0.02% to 0.5% by weight of B, 0.1% to 1% by weight of P and 4% to 25% by weight of Sn. This alloy can be applied to suitable metallic substrate surfaces in the form of casting rods as a filler material. By comparison with the prior art, the alloy has an improved ductility and is machine-processable. Other than for deposit welding, this Cu—Sn—Ni—Si—P—B alloy is usable for deposition by spraying. The addition of phosphorus, silicon and boron is described here as improving the spontaneous flow properties of the molten alloy and the wetting of the substrate surface, and to make it unnecessary to use any additional flux.

The teaching disclosed in this document stipulates a particularly high P content of 0.2% to 0.6% by weight with an obligatory Si content in the alloy of 0.05% to 0.15% by weight. This underlines the primary demand for the spontaneous flow properties of the material. With this high P content, the hot formability of the alloy will be poor, and the spinodal segregatability of the microstructure will be inadequate.

According to document U.S. Pat. No. 4,818,307 A, the size of the hard particles precipitated in a copper-based alloy has a great influence on the wear resistance thereof. For instance, complex silicide formations/boride formations of the elements nickel and iron that reach a size of 5 to 100 lam considerably increase the wear resistance of a copper alloy with 5% to 30% by weight of Ni, 1% to 5% by weight of Si, 0.5% to 3% by weight of B and 4% to 30% by weight of Fe. The element tin is not present in this material. This material is applied as antiwear layer to a suitable substrate by means of deposit welding.

Document U.S. Pat. No. 5,004,581 A describes the same copper alloy as the aforementioned U.S. Pat. No. 4,818,307 A with an additional content of tin within the content range from 5% to 15% by weight and/or of zinc within the content range from 3% to 30% by weight. The addition of Sn and/or zinc particularly improves the resistance of the material to adhesive wear. This material is likewise applied as an antiwear layer to a suitable substrate by means of deposit welding.

However, the copper alloy, according to documents U.S. Pat. Nos. 4,818,307 A and 5,004,581 A will have only very limited cold formability due to the required size of the silicide formations/boride formations of the elements nickel and iron of 5 to 100 μm.

Document U.S. Pat. No. 5,041,176 A discloses a precipitation-hardenable copper-nickel-tin alloy. This copper base alloy contains 0.1% to 10% by weight of Ni, 0.1% to 10% by weight of Sn, 0.05% to 5% by weight of Si, 0.01% to 5% by weight of Fe and 0.0001% to 1% by weight of boron. This material contains dispersed intermetallic phases of the Ni—Si system. The properties of the alloy are also elucidated by working examples that do not have any Fe content.

Document KR 10 2002 0 008 710 A (Abstract) states that spinodal Cu—Ni—Sn alloys having an Sn content greater than 6% by weight are not hot-formable. The reason given is Sn-rich segregations at the grain boundaries of the cast microstructure of the Cu—Ni—Sn alloys. Therefore, the Cu—Ni—Sn multisubstance alloy disclosed, for high-strength wires and sheets is specified as a composition of 1% to 8% by weight of Ni, 2% to 6% by weight of Sn and 0.1% to 5% by weight of two or more elements from the group of Al, Si, Sr, Ti and B.

Document U.S. Pat. No. 5,028,282 A discloses a copper alloy having 6% to 25% by weight of Ni, 4% to 9% by weight of Sn and further additions with a content of 0.04% to 5% by weight (individually or together). These further additions are (in % by weight):
0.03% to 4% Zn, 0.01% to 0.2% Zr,
0.03% to 1.5% Mn, 0.03% to 0.7% Fe,
0.03% to 0.5% Mg, 0.01% to 0.5% P,
0.03% to 0.7% Ti, 0.001% to 0.1% B,
0.03% to 0.7% Cr, 0.01% to 0.5% Co.

It is stated that the alloy elements Zn, Mn, Mg, P and B are added for deoxidation of the melt of the alloy. The elements Ti, Cr, Zr, Fe and Co have a grain-refining and strength-enhancing function.

By alloying with metalloids such as boron, silicon and phosphorus, it is possible to lower the relatively high base melt temperature, which is important for processing purposes. Therefore, these alloy additions are used particularly in the field of wear-resistant coating materials and high-temperature materials, which include, for example, the alloys of the Ni—Si—B and Ni—Cr—Si—B systems. In these materials, the alloy elements boron and silicon are considered to be particularly responsible for the significant lowering of the melting temperature of nickel-base hard alloys, which makes it possible to use them as spontaneously flowing nickel-base hard alloys.

Published specification DE 20 33 744 B includes important remarks relating to a further function of the alloy element boron in Si-containing metallic melts. According to this, the addition of boron brings about the decomposition of the oxides that form in the melt, and the formation of boron silicates which ascend to the surface of the coating layers and hence prevent the further ingress of oxygen. In this way, it is possible to achieve a smooth surface of the coating layer.

Document DE 102 08 635 B4 describes the processes in a diffusion solder site at which intermetallic phases are present. By means of diffusion soldering, parts having a different coefficient of thermal expansion are to be bonded to one another. In the case of thermomechanical stresses on this solder site or in the soldering operation itself, large stresses occur at the interfaces, which can lead to cracks particularly in the environment of the intermetallic phases. A remedy proposed is the mixing of the solder components with particles that bring about balancing of the different coefficients of expansion of the joining partners. For instance, particles of boron silicates or phosphorus silicates, due to their advantageous coefficients of thermal expansion, can minimize the thermomechanical stress in the solder bond. Moreover, the spread of the cracks that have already been induced is hindered by these particles.

Published specification DE 24 40 010 B particularly emphasizes the effect of the element boron on the electrical conductivity of a cast silicon alloy with 0.1% to 2.0% by weight of boron and 4% to 14% by weight of iron. In this Si-based alloy, a high-melting Si—B phase precipitates out, which is referred to as silicon boride.

The silicon borides that are usually present in the $SiB_3$, $SiB_4$, $SiB_6$ and/or $SiB_n$ polymorphs, determined by the boron content, differ significantly from silicon in terms of their properties. These silicon borides have metallic character, and they are therefore electrically conductive. They have exceptionally high thermal stability and oxidation stability. The $SiB_6$ polymorph, preferably used with preference for sintered products due to its very high hardness and its high abrasive wear resistance, is used in ceramics production and ceramics processing, for example.

The conventional wear-resistant hard alloys for surface coating consist of a comparatively ductile matrix composed of the metals iron, cobalt and nickel with intercalated silicides and borides as hard particles (Knotek, O.; Lugscheider, E.; Reimann, H.: Ein Beitrag zur Beurteilung verschleißfester Nickel-Bor-Silicium-Hartlegierungen [A Contribution to the Assessment of Wear-Resistant Hard Nickel-Boron-Silicon Alloys]. Zeitschrift für Werkstofftechnik 8 (1977) 10, p. 331-335). The broad use of the hard alloys of the Ni—Cr—Si, Ni—Cr—B, Ni—B—Si and Ni—Cr—B—Si systems is based on the increase in wear resistance by these hard particles. The Ni—B—Si alloys contain the silicides $Ni_3Si$ and $Ni_5Si_2$, as well as the borides $Ni_3B$ and the Ni—Si borides/Ni silicoborides $Ni_6Si_2B$. Also reported is a certain slowness to form silicide in the presence of the element boron. Further studies of the Ni—B—Si alloy system led to the detection of the high-melting Ni—Si borides $Ni_6Si_2B$ and $Ni_{4.29}Si_2B_{1.43}$ (Lugscheider, E.; Reimann, H.; Knotek, O.: Das Dreistoffsystem Nickel-Bor-Silicium [The Triphasic Nickel-Boron-Silicon System]. Monatshefte für Chemie 106 (1975) 5, p. 1155-1165). These high-melting Ni—Si borides exist in a relatively wide range of homogeneity in the direction of boron and silicon.

In many applications, the element zinc is added to the copper-nickel-tin alloys in order to reduce the metal cost. In functional terms, the effect of the alloy element zinc is more significant formation of Sn-rich or Ni—Sn-rich phases from the melt. Moreover, zinc enhances the formation of precipitates in the spinodal Cu—Ni—Sn alloys.

Furthermore, in numerous applications, a certain Pb content is also added to the copper-nickel-tin alloys to improve the dry-running properties and for better material-removing workability.

An object of the invention is to provide a high-strength copper-nickel-tin alloy which has an excellent hot formability over the entire nickel content and tin content range of 2% to 10% by weight in each case. A precursor material that has been produced by means of conventional casting methods without the necessity of performing spray compaction or thin strip casting should be usable for hot forming.

After casting, the copper-nickel-tin alloy should be free of gas pores, shrinkage pores and stress cracks, and be characterized by a microstructure with homogeneous distribution of the tin-enriched phase constituents. Moreover, intermetallic phases should already be present in the microstructure of the copper-nickel-tin alloy after casting. This is important so that the alloy has a high strength, a high hardness and an adequate wear resistance, even in the cast state. In addition, even the cast state should feature high corrosion resistance.

First, the cast state of the copper-nickel-tin alloy should not have to be homogenized by means of a suitable annealing treatment in order to be able to establish adequate hot formability.

With regard to the processing properties of the copper-nickel-tin alloy, the first aim is that the cold formability thereof is not significantly worsened in spite of the content of the intermetallic phases with respect to the conventional Cu—Ni—Sn alloys. On the other hand, with respect to the alloy, the requirement for a minimum degree of forming in the cold forming operation conducted should be eliminated. This is considered to be a prerequisite according to the prior art in order to be able to assure the spinodal segregation of the microstructure of the Cu—Ni—Sn materials without the formation of discontinuous precipitates.

A further demand with regard to the further processing of the Cu—Ni—Sn materials corresponding to the prior art is based on the cooling rate after the age hardening of the materials. Thus, it is considered necessary, after the spinodal age hardening, to rapidly cool the materials by means of water quenching in order to obtain a spinodally segregated microstructure without discontinuous precipitates. Since, however, as a result of this cooling method, hazardous intrinsic stresses can form after age hardening, it is a further object of the invention to prevent, even with regard to the alloy, the formation of discontinuous precipitates over the entire manufacturing process including age hardening.

By means of a further processing operation comprising at least one annealing operation or at least one hot forming and/or cold forming operation as well as at least one annealing operation, a fine-grain, hard particle-containing microstructure having high strength, high heat resistance, high hardness, high stress relaxation resistance and corrosion resistance, adequate electrical conductivity and a high degree of resistance to the mechanisms of friction wear and of oscillating friction wear can be established.

The invention includes a high-strength copper-nickel-tin alloy having excellent castability, hot formability and cold formability, high resistance to abrasive wear, adhesive wear and fretting wear, and improved corrosion resistance and stress relaxation resistance, consisting of (in % by weight):
2.0% to 10.0% Ni,
2.0% to 10.0% Sn,
0.01% to 1.0% Fe,
0.01% to 0.8% Mg,
0.01% to 2.5% Zn,
0.01% to 1.5% Si,
0.002% to 0.45% B,
0.004% to 0.3% P,
optionally up to a maximum of 2.0% Co,
optionally up to a maximum of 0.25% Pb,
balance: copper and unavoidable impurities, characterized in that
the Si/B ratio of the element contents in % by weight of the elements silicon and boron is a minimum of 0.4 and a maximum of 8;
the copper-nickel-tin alloy includes Si-containing phases and B-containing phases and phases of the systems Ni—Si—B, Ni—B, Fe—B, Ni—P, Fe—P, Mg—P, Ni—Si, Mg—Si and further Fe-containing phases and Mg-containing phases that significantly improve the processing properties and use properties of the alloy.

The invention also includes a high-strength copper-nickel-tin alloy having excellent castability, hot formability and cold formability, high resistance to abrasive wear, adhesive wear and fretting wear, and improved corrosion resistance and stress relaxation resistance, consisting of (in % by weight):
2.0% to 10.0% Ni,
2.0% to 10.0% Sn,
0.01% to 1.0% Fe,
0.01% to 0.8% Mg,
0.01% to 2.5% Zn,
0.01% to 1.5% Si,
0.002% to 0.45% B,
0.004% to 0.3% P,
optionally up to a maximum of 2.0% Co,
optionally up to a maximum of 0.25% Pb,
balance: copper and unavoidable impurities,
characterized in that
the Si/B ratio of the element contents in % by weight of the elements silicon and boron is a minimum of 0.4 and a maximum of 8;
the following microstructure constituents are present in the alloy after casting:
a) an Si-containing and P-containing metallic base composition having, based on the overall microstructure,
a1) up to 30% by volume of first phase constituents that can be reported by the empirical formula $Cu_h Ni_k Sn_m$ and have an (h+k)/m ratio of the element contents in atomic % of 2 to 6,
a2) up to 20% by volume of second phase constituents that can be reported by the empirical formula $Cu_p Ni_r Sn_s$ and have a (p+r)/s ratio of the element contents in atomic % of 10 to 15 and
a3) a balance of a solid copper solution;
b) phases which, based on the overall microstructure, are present
b1) at 0.01% to 10% by volume as Si-containing and B-containing phases,
b2) at 1% to 15% by volume as Ni—Si borides having the empirical formula $Ni_x Si_2 B$ with x=4 to 6,
b3) at 1% to 15% by volume as Ni borides,
b4) at 0.1% to 5% by volume as Fe borides,
b5) at 1% to 5% by volume as Ni phosphides,
b6) at 0.1% to 5% by volume as Fe phosphides,
b7) at 0.1% to 5% by volume as Mg phosphides,
b8) at 1% to 5% by volume as Ni silicides,
b9) at 0.1% to 5% by volume as Fe silicides and/or Fe-rich particles,
b10) at 0.1% to 5% by volume as Mg silicides,
b11) at 0.1% to 5% by volume as Cu-containing and Mg-containing phases and/or Cu-containing and Sn-containing and Mg-containing phases in the microstructure, which are present individually and/or as addition compounds and/or mixed compounds and are ensheathed by tin and/or the first phase constituents and/or the second phase constituents;
in the course of casting the Si-containing and B-containing phases in the form of silicon borides, the Ni—Si borides, Ni borides, Fe borides, Ni phosphides, Fe phosphides, Mg phosphides, Ni silicides, Fe silicides and/or Fe-rich particles, Mg silicides and the Cu-containing and Mg-containing phases and/or Cu-containing and Sn-containing and Mg-containing phases that are present individually and/or as addition compounds and/or mixed compounds constitute seeds for uniform crystallization during the solidification/cooling of the melt, such that the first phase constituents and/or the second phase constituents are distributed uniformly in the microstructure like islands and/or like a mesh;
the Si-containing and B-containing phases that are in the form of boron silicates and/or boron phosphorus silicates, together with phosphorus silicates and Mg oxides, assume the role of a wear-protecting and corrosion-protecting coating on semifinished materials and components of the alloy.

Advantageously, the first phase constituents and/or the second phase constituents are present in the cast microstructure of the alloy at at least 1% by volume.

The uniform distribution of the first phase constituents and/or the second phase constituents in an island form and/or in a mesh form means that the microstructure is free of segregations. Segregations of this kind are understood to mean accumulations of the first phase constituents and/or the second phase constituents in the cast microstructure, which take the form of grain boundary segregations which, under thermal and/or mechanical stress on the casting, can cause damage to the microstructure in the form of cracks that can lead to fracture. The microstructure after the casting is still free of gas pores, shrinkage pores, stress cracks and discontinuous precipitates of the (Cu, Ni)—Sn system.

In this variant, the alloy is in the cast state.

The invention further includes a high-strength copper-nickel-tin alloy having excellent castability, hot formability and cold formability, high resistance to abrasive wear, adhesive wear and fretting wear, and improved corrosion resistance and stress relaxation resistance, consisting of (in % by weight):
2.0% to 10.0% Ni,
2.0% to 10.0% Sn,
0.01% to 1.0% Fe,
0.01% to 0.8% Mg,
0.01% to 2.5% Zn,
0.01% to 1.5% Si,
0.002% to 0.45% B,
0.004% to 0.3% P,
optionally up to a maximum of 2.0% Co,
optionally up to a maximum of 0.25% Pb,
balance: copper and unavoidable impurities,
characterized in that
the Si/B ratio of the element contents in % by weight of the elements silicon and boron is a minimum of 0.4 and a maximum of 8;
after the further processing of the alloy by at least one annealing operation or by at least one hot forming operation and/or cold forming operation, as well as at least one annealing operation in the alloy, the following microstructure constituents are present:
A) a metallic base composition having, based on the overall microstructure,
A1) up to 15% by volume of first phase constituents that can be reported by the empirical formula $Cu_h Ni_k Sn_m$ and have an (h+k)/m ratio of the element contents in atomic % of 2 to 6, A2) up to 10% by volume of second phase constituents that can be reported by the empirical formula $Cu_pNi_rSn_s$ and have a (p+r)/s ratio of the element contents in atomic % of 10 to 15 and A3) a balance of a solid copper solution;

B) phases which, based on the overall microstructure, are present

B1) at 2% to 40% by volume as Si-containing and B-containing phases, Ni—Si borides having the empirical formula $Ni_xSi_2B$ with x=4 to 6, as Ni borides, Fe borides, Ni phosphides, Fe phosphides, Mg phosphides, Ni silicides, Fe silicides and/or Fe-rich particles, Mg silicides and as Cu-containing and Mg-containing phases and/or Cu-containing and Sn-containing and Mg-containing phases in the microstructure, which are present individually and/or as addition compounds and/or mixed compounds and are ensheathed by precipitates of the (Cu, Ni)—Sn system, B2) at up to 80% by volume as continuous precipitates of the (Cu, Ni)—Sn system in the microstructure, B3) at 2% to 35% by volume as Ni phosphides, Fe phosphides, Mg phosphides, Ni silicides, Fe silicides and/or Fe-rich particles, Mg silicides and as Cu-containing and Mg-containing phases and/or Cu-containing and Sn-containing and Mg-containing phases in the microstructure that are present individually and/or as addition compounds and/or mixed compounds, are ensheathed by precipitates of the (Cu, Ni)—Sn system and have a size of less than 3 µm;

the Si-containing and B-containing phases that are in the form of silicon borides, the Ni—Si borides, Ni borides, Fe borides, Ni phosphides, Fe phosphides, Mg phosphides, Ni silicides, Fe silicides and/or Fe-rich particles, Mg silicides and the Cu-containing and Mg-containing phases and/or Cu-containing and Sn-containing and Mg-containing phases that are present individually and/or as addition compounds and/or mixed compounds constitute seeds for static and dynamic recrystallization of the microstructure during the further processing of the alloy, which enables the establishment of a uniform and fine-grain microstructure;

the Si-containing and B-containing phases that are in the form of boron silicates and/or boron phosphorus silicates, together with phosphorus silicates and Mg oxides, assume the role of a wear-protecting and corrosion-protecting coating on semifinished materials and components of the alloy.

Advantageously, the continuous precipitates of the (Cu, Ni)—Sn system are present in the microstructure of the further-processed state of the alloy at at least 0.1% by volume.

Even after further processing of the alloy, the microstructure is free from segregations. Segregations of this kind are understood to mean accumulations of the first phase constituents and/or the second phase constituents in the microstructure that take the form of grain boundary segregations which, particularly under dynamic stress on the components, can cause damage to the microstructure in the form of cracks that can lead to fracture.

After further processing, the microstructure of the alloy is free of gas pores, shrinkage pores and stress cracks. It should be emphasized as an essential feature of the invention that the microstructure of the further-processed state is free of discontinuous precipitates of the (Cu, Ni)—Sn system.

In this second variant, the alloy is in the further-processed state.

This invention proceeds from the consideration that a copper-nickel-tin alloy with Si-containing and B-containing phases and with phases of the Ni—Si—B, Ni—B, Fe—B, Ni—P, Fe—P, Mg—P, Ni—Si, Mg—Si systems and with further Fe-containing phases and Mg-containing phases is provided. These phases significantly improve the processing properties of castability, hot formability and cold formability. In addition, these phases improve the use properties of the alloy by an increase in strength and resistance to abrasive wear, adhesive wear and fretting wear. These phases additionally improve corrosion resistance and stress relaxation resistance as further use properties of the invention.

The copper-nickel-tin alloy of the invention can be produced by means of a sandcasting process, shell mold casting process, precision casting process, full mold casting process, pressure diecasting process, lost foam process, permanent mold casting process, or with the aid of a continuous or semicontinous strand casting process.

The use of primary forming techniques that are complex in terms of process technology and costly is possible but is not an absolute necessity for the production of the copper-nickel-tin alloy of the invention. For example, it is possible to dispense with the use of spray compaction or thin strip casting. The cast shapes of the copper-nickel-tin alloy of the invention can especially be hot-formed directly over the entire range of Sn content and Ni content without the absolute necessity of performing homogenization annealing, for example by hot rolling, strand pressing or forging. It is also remarkable that, after shell mold casting or strand casting of the shapes made from the alloy of the invention, it is also unnecessary to conduct any complex forging processes or compression processes at an elevated temperature in order to weld, i.e. to close, pores and cracks in the material. Thus, the processing-related restrictions that existed to date in the production of semifinished products and components from copper-nickel-tin alloys are further eliminated.

With a rising Sn content of the alloy, the metallic base material of the microstructure of the copper-nickel-tin alloy of the invention in the cast state consists of increasing proportions of tin-enriched phases distributed uniformly in the solid copper solution (a phase), depending on the casting process.

These tin-enriched phases of the metallic base material can be divided into first phase constituents and second phase constituents. The first phase constituents can be reported by the empirical formula $Cu_nNi_kSn_m$ and have an (h+k)/m ratio of the element contents in an atomic % of 2 to 6. The second phase constituents can be reported by the empirical formula $Cu_pNi_rSn_s$ and have a (p+r)/s ratio of the element contents in an atomic % of 10 to 15.

The alloy of the invention is characterized by Si-containing and B-containing phases that can be divided into two groups.

The first group relates to the Si-containing and B-containing phases that take the form of silicon borides and may be present in the $SiB_3$, $SiB_4$, $SiB_6$ and $SiB_n$ polymorphs. The "n" in the compound $SiB_n$ indicates the high solubility of the element boron in the silicon lattice.

The second group of the Si-containing and B-containing phases relates to the silicate compounds of the boron silicates and/or boron phosphorus silicates.

In the copper-nickel-tin alloy of the invention, the microstructure component of the Si-containing and B-containing phases in the form of silicon borides and in the form of boron silicates and/or boron phosphorus silicates, is not less than 0.01% by volume and not more than 10% by volume.

The uniform arrangement of the first phase constituents and/or second phase constituents in the microstructure of the alloy of the invention results particularly from the effect of the Si-containing and B-containing phases that are in the form of silicon borides, and the Ni—Si borides with the empirical formula $Ni_xSi_2B$ with x=4 to 6 that mainly already precipitate out in the melt. Subsequently, during the solidification/cooling of the melt, there is the precipitation of the Ni borides and Fe borides preferably on the silicon borides and Ni—Si borides that are already present. The entirety of the boridic compounds that are present individually and/or as addition compounds and/or mixed compounds serves as primary seeds during the first solidification/cooling of the melt.

Later on in the solidification/cooling of the melt, the Ni phosphides, Fe phosphides, Mg phosphides, Ni silicides, Fe silicides and/or the Fe-rich particles, Mg silicides and the Cu-containing and Mg-containing phases and/or Cu-containing and Sn-containing and Mg-containing phases precipitate out preferentially as secondary seeds on the primary seeds of the silicon borides, Ni—Si borides, Ni borides and Fe borides that are already present individually and/or as addition compounds and/or mixed compounds.

The Ni—Si borides and the Ni borides are each present in the microstructure at 1% to 15% by volume. The Ni phosphides and Ni silicides are each present with a microstructure fraction of 1% to 5% by volume. The Fe borides, Fe phosphides, Mg phosphides and the Fe silicides and/or Fe-rich particles each assume a proportion in the microstructure of 0.1% to 5% by volume. In addition, the Mg silicides and the Cu-containing and Mg-containing phases and/or Cu-containing and Sn-containing and Mg-containing phases are each present in the microstructure at 0.1% to 5% by volume.

Thus, in the microstructure, the Si-containing and B-containing phases that are in the form of silicon borides, the Ni—Si borides with the empirical formula $Ni_xSi_2B$ with x=4 to 6, the Ni borides, Fe borides, Ni phosphides, Fe phosphides, Mg phosphides, Ni silicides, Fe silicides and/or Fe-rich particles, Mg silicides and the Cu-containing and Mg-containing phases and/or Cu-containing and Sn-containing and Mg-containing phases are present individually and/or as addition compounds and/or mixed compounds.

These phases are referred to hereinafter as crystallization seeds.

Finally, the element tin and/or the first phase constituents and/or the second phase constituents of the metallic base material preferably crystallize in the regions of the crystallization seeds, as a result of which the crystallization seeds of tin and/or the first phase constituents and/or the second phase constituents are ensheathed.

These crystallization seeds ensheathed by tin and/or the first phase constituents and/or the second phase constituents are referred to hereinafter as hard particles of the first class.

The hard particles of the first class, in the cast state of the alloy of the invention, have a size of less than 80 μm. Advantageously, the size of the hard particles of the first class is less than 50 μm.

With the rising Sn content of the alloy, the arrangement of the first phase constituents and/or the second phase constituents in an island form is transformed to a meshlike arrangement in the microstructure.

In the cast microstructure of the copper-nickel-tin alloy of the invention, the first phase constituents may assume a proportion of up to 30% by volume. The second phase constituents assume a microstructure fraction of up to 20% by volume. Advantageously, the first phase constituents and/or the second phase constituents are present in the microstructure of the cast state of the alloy at at least 1% by volume.

As a result of the addition of the alloy element boron, during the casting of the alloy of the invention, there is inhibited and hence only incomplete formation of the phosphides and silicides. For this reason, a content of phosphorus and silicon remains dissolved in the metallic base material of the cast state.

The conventional copper-nickel-tin alloys have a comparatively broad solidification interval. This broad solidification interval during casting increases the risk of gas absorption and results in an incomplete, coarse, and usually dendritic crystallization of the melt. The consequence is often gas pores and coarse Sn-rich segregations, and there is frequent occurrence of shrinkage pores and stress cracks at the phase boundary. In this group of materials, the Sn-rich segregations additionally occur preferentially at the grain boundaries.

By means of the combined content of boron, silicon and phosphorus, various processes in the melt of the alloy of the invention are activated, which crucially alter the solidification characteristics thereof by comparison with the conventional copper-nickel-tin alloys.

In the melt of the invention, the elements boron, silicon and phosphorus assume a deoxidizing function. The addition of boron and silicon makes it possible to lower the phosphorus content without reducing the intensity of the deoxidation of the melt. Using this measure, it is possible to suppress the adverse effects of adequate deoxidation of the melt by means of an addition of phosphorus. Thus, a high P content would additionally extend the solidification interval of the copper-nickel-tin alloy which is already very large in any case, which would result in an increase in the propensity to pores and propensity to segregation in this material type. The adverse effects of the addition of phosphorus are reduced by the restriction of the P content in the alloy of the invention to the range from 0.004% to 0.3% by weight.

The lowering of the base melting temperature particularly by the element boron and the crystallization seeds lead to a reduction of the solidification interval of the alloy of the invention. As a result, the cast state of the invention has a very uniform microstructure with a fine distribution of the individual phase constituents. Thus, no tin-enriched segregations occur in the alloy of the invention, particularly at the grain boundaries.

In the melt of the alloy of the invention, the effect of the elements boron, silicon and phosphorus is a reduction of the metal oxides. The elements themselves are oxidized at the same time and usually ascend to the surface of the castings, where they form, in the form of boron silicates and/or boron phosphorus silicates and of phosphorus silicates, a protective layer that protects the castings from absorption of gas. Exceptionally smooth surfaces of the castings of the alloy of the invention were found, which indicate the formation of such a protective layer. The microstructure of the cast state of the invention was also free of gas pores over the entire cross section of the castings.

In the context of the remarks relating to the documents cited, the advantages of the introduction of boron silicates and phosphorus silicates for the avoidance of stress cracks between phases having different coefficients of thermal expansion during diffusion soldering were mentioned.

A basic concept of the invention is that applying the effect of boron silicates, boron phosphorus silicates and phosphorus silicates with regard to the matching of the different coefficients of thermal expansion of the joining partners in diffusion soldering to the processes in the casting, hot forming and thermal treatment of the copper-nickel-tin materials. Due to the broad solidification interval of these alloys, high mechanical stresses occur between the low-Sn and Sn-rich structure regions that crystallize in an offset manner and can lead to cracks and pores. In addition, these damage features can also occur in the hot forming and high-temperature annealing operations on the copper-nickel-tin alloys due to the different hot forming characteristics and the different coefficients of thermal expansion of the low-Sn and Sn-rich microstructure constituents.

The effect of the combined addition of boron, silicon and phosphorus to the copper-nickel-tin alloy of the invention is first, by means of the effect of the crystallization seeds during the solidification of the melt, a microstructure having a uniform distribution of the first phase constituents and/or the second phase constituents of the metallic base material in the form of islands and/or in the form of a mesh. In addition to the crystallization seeds, the Si-containing and B-containing phases that form during the solidification of the melt and in the form of boron silicates and/or boron phosphorus silicates, together with the phosphorus silicates, assure the necessary matching of the coefficients of the thermal expansion of the first phase constituents and/or the second phase constituents and of the solid copper solution of the metallic base material. In this way, the formation of pores and stress cracks between the phases with different Sn content is prevented.

A further effect of the inventive alloy content of the copper-nickel-tin alloy is a significant change in the grain structure in the cast state. Thus, it was found that, in the primary cast microstructure, a substructure with a grain size of the subgrains of less than 30 μm is formed.

Alternatively, the alloy of the invention can be subjected to further processing by annealing or by a hot forming and/or cold forming operation as well as at least one annealing operation.

One means of further processing the copper-nickel-tin alloy of the invention is to convert the castings to the final form with the properties as required by means of at least one cold forming operation as well as at least one annealing operation.

As a result of the uniform cast microstructure and the hard particles of the first class that have precipitated out therein, the alloy of the invention, even in the cast state, has high strength. As a result, the castings have relatively low cold formability that makes it difficult to process them further economically. For this reason, the performance of a homogenization annealing operation on the castings prior to a cold forming operation has been found to be advantageous.

For assurance of the age hardenability of the invention, accelerated cooling after the homogenization annealing processes has been found to be advantageous. It has been here found that, due to the slowness of the precipitation mechanisms and separation mechanisms, aside from water quenching, cooling methods with a relatively low cooling rate can also be used. For instance, the use of accelerated air cooling has also been found to be practicable in order to reduce the hardness-enhancing and strength-increasing effect of the precipitation processes and separation processes in the microstructure during the homogenization annealing operation of the invention to a sufficient degree.

The outstanding effect of the crystallization seeds for the recrystallization of the microstructure of the invention is manifested in the microstructure which can be established after cold forming by means of annealing within the temperature range from 170 to 880° C. and annealing time between 10 minutes and 6 hours. The exceptionally fine structure of the recrystallized alloy enables further cold forming steps with a degree of forming ε of usually more than 70%. In this way, ultrahigh-strength states of the alloy can be established.

These high degrees of cold forming that have become possible in the further processing of the invention can establish particularly high values for tensile strength $R_m$, yield point $R_{p0.2}$ and hardness. Particularly the level of the $R_{p0.2}$ parameter is important for the sliding elements and guide elements. In addition, a high value of $R_{p0.2}$ is a prerequisite for the necessary spring characteristics of plug connectors in electronics and electrical engineering.

In the remarks of numerous documents that describe the prior art relating to the processing and the properties of copper-nickel-tin materials, reference is made to the need to observe a minimum degree of cold forming of 75%, for example, in order to prevent the precipitation of discontinuous precipitates of the (Cu, Ni)—Sn system in the microstructure.

By contrast, the microstructure of the alloy of the invention, irrespective of the degree of cold forming, remains free of discontinuous precipitates of the (Cu, Ni)—Sn system. For instance, for particularly advantageous embodiments of the invention, it was found that, even in the case of extremely small degrees of cold forming of less than 20%, the microstructure of the invention remains free of discontinuous precipitates of the (Cu, Ni)—Sn system.

The conventional, spinodally segregatable Cu—Ni—Sn materials, according to the prior art, are considered to be hot formable with great difficulty, if at all.

The effect of the crystallization seeds was likewise observed during the process of hot forming of the copper-nickel-tin alloy of the invention. The crystallization seeds are considered to be primarily responsible for the fact that the dynamic recrystallization in the hot forming of the alloy of the invention takes place preferentially within the temperature range from 600 to 880° C. This results in a further increase in the uniformity and fine granularity of the microstructure.

Advantageously, the cooling of the semifinished products and components after the hot forming can be carried out with calmed or accelerated air or with water.

As is the case after casting, it was also possible to establish an exceptionally smooth surface of the parts after the hot forming of the castings. This observation suggests the formation of Si-containing and B-containing phases that take the form of boron silicates and/or boron phosphorus silicates, and of phosphorus silicates, which takes place in the material during the hot forming. The silicates together with the crystallization seeds, even during the hot forming, result in matching of the different coefficients of thermal expansion of the phases of the metallic base material of the invention. Thus, the surface of the hot-formed parts and the microstructure, as is the case after casting, were free of cracks and pores after the hot forming as well.

Advantageously, at least one annealing treatment of the cast state and/or the hot-formed state of the invention can be conducted within the temperature range from 170 to 880° C. for the duration of 10 minutes to 6 hours, and alternatively with cooling under calmed or accelerated air or with water.

One aspect of the invention relates to an advantageous process for further processing of the cast state or the hot-formed state or the annealed cast state or the annealed hot-formed state that includes the performance of at least one cold forming operation.

Preferably, at least one annealing treatment of the cold-formed state of the invention can be conducted within the temperature range from 170 to 880° C. for the duration of 10 minutes to 6 hours, and alternatively with cooling under calmed or accelerated air or with water.

Advantageously, a stress relief annealing/age hardening annealing operation can be conducted within the temperature range from 170 to 550° C. for the duration of 0.5 to 8 hours.

After further processing of the alloy by at least one annealing operation or by at least one hot forming and/or cold forming operation as well as at least one annealing operation, precipitates of the (Cu, Ni)—Sn system are preferably formed in the regions of the crystallization seeds, as a result of which the crystallization seeds are ensheathed by these precipitates.

These crystallization seeds ensheathed by precipitates of the (Cu, Ni)—Sn system are referred to hereinafter as hard particles of the second class.

As a result of the further processing of the alloy of the invention, the size of the hard particles of the second class decreases compared to the size of the hard particles of the first class. Particularly with an increasing degree of cold forming, there is an advancing reduction in size of the hard particles of the second class since these, being the hardest constituents of the alloy, cannot contribute to the change in shape of the metallic base material that surrounds them. Depending on the degree of cold forming, the resulting hard particles of the second class and/or the resulting segments of the hard particles of the second class have a size of less than 40 µm to even less than 5 µm.

The Ni content and the Sn content of the invention each vary within the limits between 2.0% and 10.0% by weight. A Ni content and/or a Sn content of below 2.0% by weight would result in excessively low strength values and hardness values. Moreover, the running properties of the alloy under sliding stress would be inadequate. The resistance of the alloy to abrasive and adhesive wear would not meet the demands. At a Ni content and/or a Sn content of more than 10.0% by weight, the toughness properties of the alloy of the invention would worsen rapidly, with the result that the dynamic durability of the components made of the material is lowered.

With regard to the assurance of optimal dynamic durability of the components made of the alloy of the invention, the content of nickel and tin within the range from 3.0% to 9.0% by weight in each case is found to be advantageous. In this regard, for the invention, the range from 4.0% to 8.0% by weight in each case is particularly preferred for the content of the elements nickel and tin.

With regard to the Ni-containing and Sn-containing copper materials, it is known from the prior art that the degree of spinodal segregation of the microstructure rises with increasing Ni/Sn ratio of the element contents in percent by weight of the elements nickel and tin. This is true of a Ni content and a Sn content over and above about 2% by weight. With decreasing Ni/Sn ratio, the mechanism of the precipitation formation of the (Cu, Ni)—Sn system gains greater weight, which leads to a reduction in the spinodally segregated microstructure fraction. One particular consequence is a greater degree of formation of discontinuous precipitates of the (Cu, Ni)—Sn system with decreasing Ni/Sn ratio.

The essential features of the copper-nickel-tin alloy of the invention include the crucial suppression of the effect of the Ni/Sn ratio on the formation of discontinuous precipitates in the microstructure. Thus, it has been found that, largely irrespective of the Ni/Sn ratio and irrespective of the age hardening conditions, there is no precipitation of discontinuous precipitates of the (Cu, Ni)—Sn system in the microstructure of the invention.

During further processing of the alloy of the invention, by contrast, continuous precipitates of the (Cu, Ni)—Sn system form at up to 80% by volume. Advantageously, the continuous precipitates of the (Cu, Ni)—Sn system are present in the microstructure of the further-processed state of the alloy at at least 0.1% by volume.

The element iron is included in the alloy of the invention at 0.01% to 1.0% by weight. Iron contributes to increasing the proportion of the crystallization seeds, and hence promotes the uniform formation of the microstructure in the casting process. The Fe-containing hard particles in the microstructure bring about an increase in strength, hardness and wear resistance of the alloy. If the Fe content is below 0.01% by weight, these effects on the microstructure and the properties of the alloy are observed only to an inadequate extent. If the Fe content exceeds 1.0% by weight, the microstructure will increasingly contain cluster-like accumulations of Fe-rich particles. The Fe content of these clusters would be available only to a relatively small degree for the formation of the crystallization seeds and hard particles and for the grain refining of the microstructure. Moreover, there would be a deterioration in the toughness properties of the invention. An advantageous Fe content is from 0.02% to 0.6% by weight. A preferred Fe content is within the range of 0.06% to 0.4% by weight.

Due to the similarity between the elements nickel and iron, in addition to the Ni—Si borides, it is also possible for Fe—Si borides and/or Ni—Fe—Si borides to form in the microstructure of the alloy of the invention. The Ni—Fe—Si borides can be reported by the empirical formula $(Ni, Fe)_x Si_2 B$ with $x=4$ to 6.

As well as the Fe borides and Fe phosphides, the microstructure of the invention also includes additional Fe-containing phases.

As a result of the slowness of the precipitation of the Fe silicides, and the dependence of the precipitation of the Fe silicides on the process conditions in the production and further processing of the alloy of the invention, these additional Fe-containing phases are in the form of Fe silicides and/or of Fe-rich particles in the microstructure.

The element magnesium is included in the alloy of the invention at 0.01% to 0.8% by weight. Magnesium contributes to increasing the proportion of the crystallization seeds and hence promotes the uniform formation of the microstructure in the casting process. The effect of the Mg-containing hard particles in the microstructure is an increase in the strength, hardness and wear resistance of the alloy. If the Mg content is below 0.01% by weight, these effects on the microstructure and the properties of the alloy are observed only to an insufficient extent. If the Mg content exceeds 0.8% by weight, there will be a deterioration in the castability of the alloy. Moreover, there would be a deterioration in the toughness properties of the alloy. An advantageous Mg content is from 0.05% to 0.6% by weight. Particular preference is given to an Mg content of 0.1% to 0.4% by weight.

As well as the Mg phosphides and Mg silicides, the microstructure of the invention also includes additional Mg-containing phases.

Probably due to the comparatively low melting temperature of the element magnesium, no distinctly analyzable content of Mg borides was detectable in the alloy of the invention. Nevertheless, it is considered possible that Mg borides can form as additional Mg-containing phases under particular process conditions in the production and further processing of the invention. These Mg borides may be present in the $MgB_2$ and/or $MgB_{12}$ polymorphs with a proportion of 0.1% to 5% by volume in the microstructure in the form of hard particles of the first and second class.

Proceeding from the $Cu_2Mg$ structure type of the precipitates in binary Cu—Mg materials, such Cu-containing and Mg-containing phases are also present in the microstructure of the alloy of the invention as additional Mg-containing phases. With a rising Sn content of the invention, these phases may be partly or wholly replaced by the Cu-containing, Sn-containing and Mg-containing phases. For this reason, Cu-containing and Mg-containing phases, and/or Cu-containing, Sn-containing and Mg-containing phases, are present in the microstructure of the copper-nickel-tin alloy of the invention.

The element zinc is added to the copper-nickel-tin alloy of the invention with a content of 0.01% to 2.5% by weight. It was found that the alloy element zinc, depending on the Sn content of the alloy, increases the proportion of the first phase constituents and/or the second phase constituents in the metallic base material of the invention, which results in an increase in strength and hardness. The interactions between the Ni component and the Zn component are considered to be responsible for this. In addition, as a result of these interactions between the Ni component and the Zn component, a decrease in the size of the hard particles of the first and second classes was found, which thus formed in a finer distribution in the microstructure.

As a result of the addition of zinc, there are also interactions between the alloy elements magnesium and zinc in the material of the invention. For instance, it was found that the zinc content lowered the size of the Mg-containing phases, which results in these phases also being formed in a finer distribution in the microstructure. As a result of these interactions between the Mg component and the Zn component, a decrease in the size of the hard particles of the first and second classes was found, which thus formed in a finer distribution in the microstructure.

Below 0.01% by weight of Zn, it was not possible to observe these effects on the microstructure and the mechanical properties of the invention. At a Zn content above 2.5% by weight, the toughness properties of the alloy were lowered. There was also a deterioration in the corrosion resistance of the copper-nickel-tin alloy of the invention. Advantageously, a zinc content in the range from 0.05% to 2.0% by weight can be added to the invention. Preference is given to a zinc content in the range from 0.1% to 1.0% by weight.

The effect of the crystallization seeds during the solidification/cooling of the melt, the effect of the crystallization seeds as recrystallization seeds, and the effect of the silicate-based phases for the purpose of wear protection and corrosion protection can only achieve a degree of technical significance in the alloy of the invention when the silicon content is at least 0.01% by weight and the boron content at least 0.002% by weight. If, by contrast, the Si content exceeds 1.5% by weight and/or the B content 0.45% by weight, this leads to a deterioration in casting characteristics. The excessively high content of crystallization seeds would make the melt crucially thicker. Moreover, the result would be reduced toughness properties of the alloy of the invention.

An advantageous range for the Si content has been considered to be within the limits from 0.05% to 0.9% by weight. A particularly advantageous content for silicon has been found to be from 0.1% to 0.6% by weight.

For the element boron, the content of 0.01% to 0.4% by weight is considered to be advantageous. The content for boron of 0.02% to 0.3% by weight has been found to be particularly advantageous.

For the assurance of an adequate content of Ni—Si borides and of Si-containing and B-containing phases that are in the form of boron silicates and/or boron phosphorus silicates, a lower limit for the element ratio of the elements silicon and boron has been found to be important. For this reason, the minimum Si/B ratio of the element contents of the elements silicon and boron in percent by weight in the alloy of the invention is 0.4. An advantageous minimum Si/B ratio of the element contents of the elements silicon and boron for the alloy of the invention in percent by weight is 0.8. Preferably, the minimum Si/B ratio of the element contents of the elements silicon and boron in percent by weight is 1.

For a further important feature of the invention, the fixing of an upper limit for the Si/B ratio of the element contents of the elements silicon and boron in percent by weight of 8 is important. After the casting, fractions of the silicon are present dissolved in the metallic base material and bound in the hard particles of the first class.

During further thermal or thermomechanical processing of the cast state, there is at least partial dissolution of the silicide components of the hard particles of the first class. This increases the Si content of the metallic base material. If this exceeds an upper limit, there is the precipitation of an excess proportion particularly of Ni silicides with increasing size. These would crucially lower the cold formability of the invention.

For this reason, the maximum Si/B ratio of the element contents of the elements silicon and boron in percent by weight of the alloy of the invention is 8. By virtue of this measure, it is possible to lower the size of the silicides that form during further thermal or thermomechanical processing of the cast state of the alloy to below 3 µm. In addition, this limits the content of silicides. In this regard, the limitation of the Si/B ratio of the element contents of the elements silicon and boron in percent by weight to the maximum value of 6 has been found to be particularly advantageous.

The precipitation of the crystallization seeds affects the viscosity of the melt of the alloy of the invention. This fact emphasizes why an addition of phosphorus is indispensable. The effect of phosphorus is that the melt is sufficiently mobile in spite of the crystallization seeds, which is of great significance for castability of the invention. The phosphorus content of the alloy of the invention is 0.004% to 0.3% by weight.

Below 0.004% by weight, the P content no longer contributes to assurance of sufficient castability of the invention. If the phosphorus content of the alloy assumes values above 0.3% by weight, on the one hand, an excessively large Ni component is bound in the form of phosphides, which lowers the spinodal separability of the microstructure. On the other hand, in the case of a P content above 0.3% by weight, there would be a crucial deterioration in the hot formability of the invention. For this reason, a P content of 0.01% to 0.3% by weight has been found to be particularly advantageous. Preference is given to a P content in the range from 0.02% to 0.2% by weight.

The alloy element phosphorus is of very great significance for another reason. Together with the required maximum Si/B ratio of the element contents of the elements silicon and boron in a percent by weight of 8, it can be attributed to the phosphorus content of the alloy that, after further processing of the invention, Ni phosphides, Fe phosphides, Mg phosphides, Ni silicides, Fe silicides and/or Fe-rich particles, Mg silicides and Cu-containing and Mg-containing phases and/or Cu-containing and Sn-containing and Mg-containing phases, which are present individually and/or as addition compounds and/or mixed compounds and are ensheathed by precipitates of the (Cu, Ni)—Sn system, with a size of not more than 3 μm and with a content from 2% up to 35% by volume can form in the microstructure.

These Ni phosphides, Fe phosphides, Mg phosphides, Ni silicides, Fe silicides and/or Fe-rich particles, Mg silicides, Cu-containing and Mg-containing phases, and/or Cu-containing, Sn-containing and Mg-containing phases, which are present individually and/or as addition compounds and/or mixed compounds and are ensheathed by precipitates of the (Cu, Ni)—Sn system, and have a size of not more than 3 μm, are referred to hereinafter as hard particles of the third class.

In the microstructure of the further-processed state of the particularly preferred configuration of the invention, the hard particles of the third class even have a size of less than 1 μm.

With regard to influencing the size of the hard particles of the third class, the element zinc has also been found to be important. Particularly the Cu-containing and Mg-containing phases, and/or Cu-containing, Sn-containing and Mg-containing phases, form in a fine dispersion in the microstructure of the invention due to the effect of the zinc.

First, these hard particles of the third class supplement the hard particles of the second class in their function as wear substrates. Thus, they increase the strength and the hardness of the metallic base material and hence improve the resistance of the alloy to abrasive wear stress. Second, the hard particles of the third class increase the resistance of the alloy to adhesive wear. Finally, the effect of these hard particles of the third class is a crucial increase in the hot strength and the stress relaxation resistance of the alloy of the invention. This is an important prerequisite for the use of the alloy of the invention particularly for sliding elements and components and connecting elements in electronics/electrical engineering.

Due to the content of hard particles of the first class in the microstructure of the cast state and of hard particles of the second and third classes in the microstructure of the further-processed state, the alloy of the invention has the character of a precipitation-hardenable material. Advantageously, the invention corresponds to a precipitation-hardenable and spinodally segregatable copper-nickel-tin alloy.

The sum total of the element contents of the elements silicon, boron and phosphorus is advantageously at least 0.25% by weight.

The cast variant and the further-processed variant of the alloy of the invention may include the following optional elements:

The element cobalt may be added to the copper-nickel-tin alloy of the invention at a content of up to 2.0% by weight. Due to the similarity between the elements nickel, iron and cobalt, and due to the Si boride-forming, boride-forming, silicide-forming and phosphide-forming properties of cobalt in relation to nickel and iron, the alloy element cobalt may be added in order to take part in the formation of the crystallization seeds and of the hard particles of the first, second and third classes in the alloy. As a result, it is possible to reduce the Ni content bound within the hard particles. This can achieve the effect that the Ni content effectively available in the metallic base material for the spinodal segregation of the microstructure rises. With the addition of advantageously 0.1% to 2.0% by weight of Co, it is thus possible to considerably increase the strength and hardness of the invention.

Optionally, small proportions of lead above the contamination limit up to a maximum of 0.25% by weight may be added to the copper-nickel-tin alloy of the invention. In a particularly preferred advantageous embodiment of the invention, the copper-nickel-tin alloy is free of lead apart from any unavoidable contaminations, which meets current environmental standards. In this respect, lead contents up to a maximum of 0.1% by weight of Pb are contemplated.

The formation of Si-containing and B-containing phases that are in the form of boron silicates and/or boron phosphorus silicates and of phosphorus silicates not only results in a significant reduction in the content of pores and cracks in the microstructure of the alloy of the invention. Together with the Mg oxides, these silicate-based phases also assume the role of a wear-protecting and corrosion-protecting coating on the components.

During the adhesive wear stress on a component made of the copper-nickel-tin alloy of the invention, the alloy element tin makes a particular contribution to the formation of what is called a tribological layer between the friction partners. Particularly under mixed friction conditions, this mechanism is important when the dry-running properties of a material become increasingly important. The tribological layer reduces the size of the purely metallic contact area between the friction partners, which prevents welding or fretting of the elements.

The rise in the efficiency of modern engines, machines and aggregates, results in ever higher operating pressures and operating temperatures. This is being observed particularly in the newly developed internal combustion engines where the aim is ever more complete combustion of the fuel. In addition to the elevated temperatures in the space around the internal combustion engines, there is the evolution of heat that occurs during the operation of the slide bearing systems. Due to the high temperatures in a bearing operation, there is formation of Si-containing and B-containing phases in the form of boron silicates and/or boron phosphorus silicates, and of phosphorus silicates in the parts made of the alloy of the invention similar to that formed during casting and hot forming. Together with the Mg oxides, these compounds also reinforce the tribological layer which forms primarily because of the alloy element tin, which results in an increased adhesive wear resistance of the sliding elements made of the alloy of the invention.

Thus, the alloy of the invention assures a combination of the properties of wear resistance and corrosion resistance. This combination of properties leads to a high resistance, as required, against the mechanisms of friction wear and to a high material resistance against frictional corrosion. In this way, the invention is of excellent suitability for use as sliding element and plug connector, since it has a high degree of resistance to sliding wear and to oscillating friction wear, called fretting.

As well as the important contribution of the hard particles of the third class to increasing the resistance of the invention to the abrasive and adhesive mechanism of friction wear, the hard particles of the third class make a crucial contribution to increasing oscillation resistance. Together with the hard particles of the second class, the hard particles of the third class constitute hindrances to the spread of fatigue cracks that can be introduced into the stressed component particularly under oscillating friction wear. Thus, the hard particles of the second and third classes particularly supplement the wear-protecting and corrosion-protecting effect of the Si-containing and B-containing phases that are in the form of boron silicates and/or boron phosphorus silicates, and of the phosphorus silicates and the Mg oxides with regard to the increase in resistance of the alloy of the invention to oscillating friction wear, called fretting.

Heat resistance and stress relaxation resistance are among the further essential properties of an alloy which is used for end uses where higher temperatures occur. For assurance of sufficiently high heat resistance and stress relaxation resistance, a high density of fine precipitates is considered to be advantageous. Precipitates of this kind in the alloy of the invention are the hard particles of the third class and the continuous precipitates of the (Cu, Ni)—Sn system.

Due to the uniform and fine-grain microstructure with substantial freedom from pores, cracks and segregations, and the content of hard particles of the first class, the alloy of the invention has a high degree of strength, hardness, ductility, complex wear resistance and corrosion resistance, even in the cast state. This combination of properties means that sliding elements and guide elements can be produced even from the cast form. The cast state of the invention can additionally also be used for the production of housings for fittings and of housings for water pumps, oil pumps and fuel pumps. The alloy of the invention is also usable for propellers, wings, screws and hubs for shipbuilding.

The further-processed variant of the invention may find use for the fields of use having particularly high complex and/or dynamic component stress.

The excellent strength properties and wear resistance, and corrosion resistance of the copper-nickel-tin alloy of the invention mean that a further use is possible. Thus, the invention is suitable for metallic articles in constructions for the breeding of seawater-dwelling organisms (aquaculture). In addition, the invention can be used to produce pipes, seals and connecting bolts that are required in the maritime and chemical industries.

For the use of the alloy of the invention for production of percussion instruments, the material is of great significance. Especially cymbals of high quality have to date been manufactured from usually tin-containing copper alloys by means of hot forming and at least one annealing operation before they are converted to the final shape, usually by means of a bell or shell. Subsequently, the cymbals are annealed once again before the material-removing final processing thereof. The production of the various variants of the cymbals (for example ride cymbals, hi-hats, crash cymbals, china cymbals, splash cymbals and effect cymbals) accordingly requires particularly advantageous hot formability of the material, which is assured by the alloy of the invention. Within the range limits of the chemical composition of the invention, the different microstructure components of the phases of the metallic base material and the different hard particles can be set within a very wide range. In this way, it is possible to affect the sound characteristics of the cymbals even from the point of view of an alloy.

Especially for the production of composite slide bearings, the invention may be used to be applied to a composite partner by means of a joining method. Thus, composite production between sheets, plates or strips of the invention and steel cylinders or steel strips, preferably made of a quenched and tempered steel, is possible by means of forging, soldering or welding with the optional performance of at least one annealing operation within the temperature range from 170 to 880° C. It is also possible, for example, to produce composite bearing cups or composite bearing bushes by roll cladding, inductive or conductive roll cladding or by laser roll cladding, likewise with the optional performance of at least one annealing operation within the temperature range from 170 to 880° C.

The formation of the microstructure in the alloy of the invention gives rise to further options for the production of composite sliding elements such as composite bearing cups or composite bearing bushes. For instance, it is possible to apply a coating of tin or of a Sn-rich material which serves as running layer in a bearing operation to a base body from the invention by means of hot-dip tinning or electrolytic tinning, sputtering or by the PVD method or the CVD method.

In this way, high-performance composite sliding elements such as composite bearing cups or composite bearing bushes can also be produced as a three-layer system, with a bearing backing made of steel, the actual bearing made of the alloy of the invention and the running layer made of tin or of the Sn-rich coating. This multilayer system has a particularly advantageous effect on the adaptability and the ease of running-in of the slide bearing and improves the embedability of extraneous particles and abrasive particles, with no damage resulting from overriding of the layer composite system as a result of pore formation and crack formation in the boundary region of the individual layers even under thermal or thermomechanical stress on the slide bearing.

The great potential of the copper-nickel-tin materials particularly with regard to strength, spring properties and stress relaxation resistance can be utilized, via the use of the alloy of the invention, for the field of use of tinned components, wire elements, guiding elements and connecting elements in electronics and electrical engineering as well. Thus, the microstructure of the invention reduces the damage mechanism of pore formation and crack formation in the boundary region between the alloy of the invention and the tinning even at elevated temperatures, which counteracts any increase in the electrical passage resistance of the components or even detachment of the tinning.

Machine processing of the semifinished products and components made from the conventional copper-nickel-tin kneading alloys with a Ni content and a Sn content of up to about 10% by weight in each case is possible only with great difficulty due to inadequate material removability. Thus, in particular, the occurrence of long turnings causes long machine shutdown times since the turnings first have to be removed by hand from the processing area of the machine.

In the alloy of the invention, by contrast, the different hard particles act as turning breakers. The short friable turnings and/or entangled turnings that thus arise facilitate material removability, and for that reason the semifinished products and components made from the cast state and the further-processed state of the alloy of the invention have better machine processibility.

Examples of the invention are explained in more detail below that include references to the drawings, in which.

Figure 1:
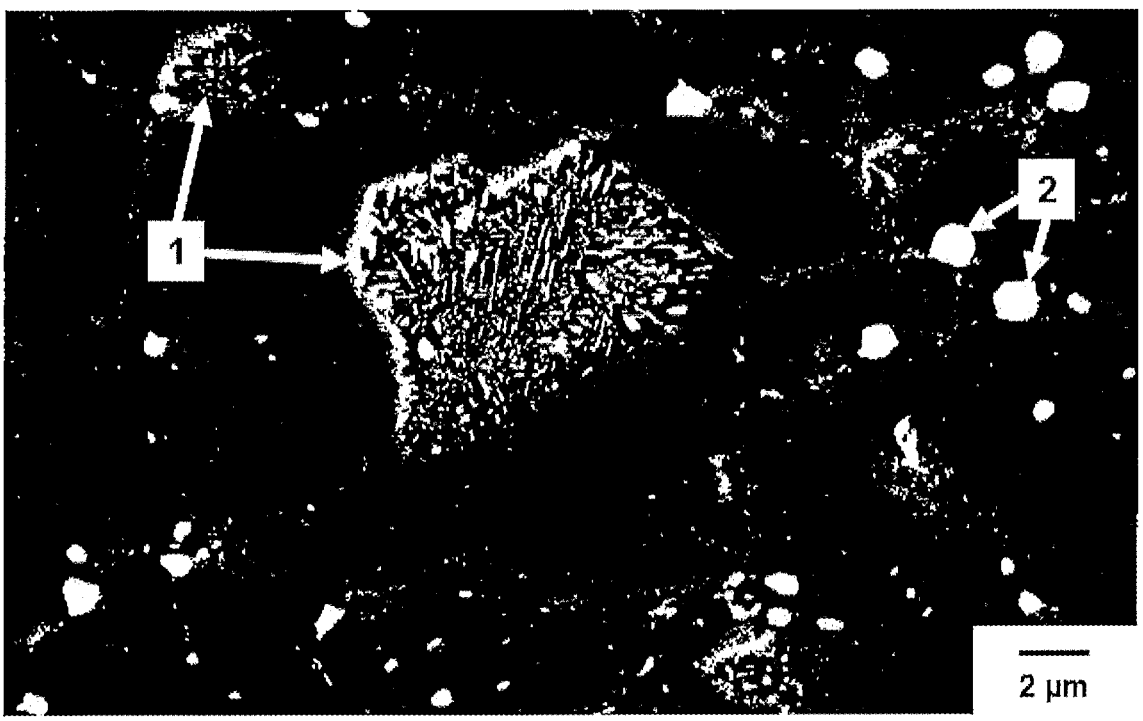
FIG. 1 and FIG. 2 show discontinuous precipitates of the (Cu, Ni)-Sn system and Ni phosphides in the microstructure of reference material R.

An important working example of the invention is illustrated by Tables 1 to 10. Cast plates of the copper-nickel-tin alloy of the invention and of the reference material were produced by strand casting. The chemical composition of the casts is apparent from Table 1.

Table 1 shows the chemical composition of a working example A and of a reference material R. The working example A is characterized by a Ni content of 5.90% by weight, a Sn content of 5.85% by weight, a Mg content of 0.28% by weight, a Fe content of 0.19% by weight, a Zn content of 0.52% by weight, a Si content of 0.29% by weight, a B content of 0.12% by weight, a P content of 0.13% by weight and by a balance of copper. The reference material R, a conventional copper-nickel-tin-phosphorus alloy, has a Ni content of 5.78% by weight, a Sn content of 5.75% by weight, a P content of 0.032% by weight and a balance of copper.

TABLE 1

Chemical composition of a working example A and of a reference material R (in % by weight)

| Alloy | Cu | Ni | Sn | Mg | Fe | Zn | Si | B | P |
|---|---|---|---|---|---|---|---|---|---|
| A | Balance | 5.90 | 5.85 | 0.28 | 0.19 | 0.52 | 0.29 | 0.12 | 0.13 |
| R | Balance | 5.78 | 5.75 | — | — | — | — | — | 0.032 |

The microstructure of the strand-cast plates of the reference material R has gas pores and shrinkage pores, and Sn-rich segregations particularly at the grain boundaries.

By contrast with the reference material R, the strand casting of the working example A, due to the effect of the crystallization seeds, has a uniformly solidified, pore-free and segregation-free microstructure.

The metallic base material of the cast state of the working example A consists of a solid copper solution with, based on the overall microstructure, about 10% to 15% by volume of intercalated first phase constituents in the form of islands, which can be reported by the empirical formula $Cu_nNi_kSn_m$, and have a ratio $(h+k)/m$ of the element contents in an atomic % of 2 to 6. It was possible to detect the compounds $CuNi_{14}Sn_{23}$ and $CuNi_9Sn_{20}$ with a ratio $(h+k)/m$ of 3.4 and 4. Also, second phase constituents that can be reported by the empirical formula $Cu_pNi_rSn_s$ and have a ratio $(p+r)/s$ of the element contents in atomic % of 10 to 15, are intercalated in the form of islands in the metallic base material at about 5% to 10% by volume based on the overall microstructure. The compounds $CuNi_3Sn_8$ and $CuNi_4Sn_7$ were detected with a ratio $(p+r)/s$ of 11.5 and 13.3. The first and second phase constituents of the metallic base material are predominantly crystallized in the region of the crystallization seeds and ensheath them.

The analysis of the hard particles of the first class in the cast state of the working example A revealed the compound $SiB_6$ as a representative of the Si-containing and B-containing phases, $Ni_6Si_2B$ as a representative of the Ni—Si borides, $Ni_3B$ as a representative of the Ni borides, FeB as a representative of the Fe borides, $Ni_3P$ as a representative of the Ni phosphides, $Fe_2P$ as a representative of the Fe phosphides, $Mg_3P_2$ as a representative of the Mg phosphides, $Ni_2Si$ as a representative of the Ni silicides, to Fe-rich particles, $Mg_2Si$ as a representative of the Mg silicides, and $Cu_4SnMg$ as a representative of the Cu-containing and Sn-containing and Mg-containing phases, which are present in the microstructure individually and/or as addition compounds and/or mixed compounds. In addition, these hard particles are ensheathed by tin and/or the first phase constituents and/or second phase constituents of the metallic base material.

During the process of casting the working example A, a substructure formed in the primary cast grains. These subgrains in the cast microstructure of the working example A of the invention have a grain size of less than 10 μm. As a result of the subgrain structure and the hard particles precipitated in the microstructure of the working example A of the invention, the hardness HB of the cast state, at 160, is well above the hardness of 94 HB of the strand casting of the reference material R (Table 2).

TABLE 2

Hardness HB 2.5/62.5 of the cast state and of the state of the alloys A and R that have been age-hardened at 400° C./3 h/air

| Alloy | Strand casting Hardness HB 2.5/62.5 | Strand casting + 400° C./3 h/air Hardness HB 2.5/62.5 |
|---|---|---|
| A | 160 | 182 |
| R | 94 | 145 |

Likewise shown in Table 2 are the hardness values that have been ascertained on the strand casting of alloys A and R that has been age-hardened at 400° C. for a duration of 3 hours. The rise in hardness from 94 to 145 HB is at its greatest for the reference material R. The hardening is particularly attributable to the thermally activated formation of segregation of the Sn-rich and Ni—Sn-rich phase in the microstructure. The tin-enriched phase constituents precipitate out in much finer form in the region of the hard particles in the microstructure of the working example A. For this reason, the rise in hardness from 160 to 182 HB is not as marked.

One intention of the invention is that of maintaining the good cold formability of the conventional copper-nickel-tin alloys in spite of the introduction of hard particles. To verify the degree to which this aim is achieved, the manufacturing program 1 according to Table 3 was conducted. This manufacturing program consisted of one cycle of cold forming and annealing operations, wherein the cold rolling steps were each carried out with the maximum possible degree of cold forming.

Due to the high hardness of the cast state of the working example A, it was calcined at the temperature of 740° C. for the duration of 2 hours and subsequently cooled down in an accelerated manner in water. This brought about the assimilation of the properties of the cast state of A and R with regard to strength and hardness.

The degrees of cold forming ε of 47% and 92% that are achievable for the working example A underline the fact that the alloy of the invention, in spite of the content of hard particles, can achieve and, after intermediate annealing, even surpass the shape-changing properties of the conventional copper-nickel-tin alloy R.

The thermal sensitivity of the reference material R with regard to the formation of the Sn-rich and Ni—Sn-rich segregations was also found in the annealing between the two cold forming steps (No. 4 in Table 3). For this reason, the annealing temperature of 740° C. that was used for the intermediate annealing of the cold-rolled plate of alloy A had to be lowered to 690° C. for R.

TABLE 3

Manufacturing program 1 for strips made from the strand-cast plates of the working example A and of the reference material R

| No. | Manufacturing steps |
|---|---|
| 1 | Strand casting of plates of alloys A and R |
| 2 | Annealing the cast plate of alloy A: 740° C./2 h + water quench |

TABLE 3-continued

Manufacturing program 1 for strips made from the strand-cast plates of the working example A and of the reference material R

| No. | Manufacturing steps |
|---|---|
| 3 | Cold rolling:<br>Alloy A: from 10 to 5.25 mm ($\varepsilon$ = 47%, $\varphi$ = 0.64)<br>Alloy R: from 24.5 to 12.1 mm ($\varepsilon$ = 50%, $\varphi$ = 0.7) |
| 4 | Annealing:<br>Alloy A: 740° C./2 h + water quench<br>Alloy R: 690° C./2 h + water quench |
| 5 | Cold rolling:<br>Alloy A: from 5.25 to 0.4 mm ($\varepsilon$ = 92%, $\varphi$ = 2.6)<br>Alloy R: from 12.1 to 2.33 mm ($\varepsilon$ = 81%, $\varphi$ = 1.6) |
| 6 | Age hardening: 300° C./4 h, 400° C./3 h, 450° C./3 h + air cooling |

After the performance of the manufacturing program 1, the indices of the strips of materials A and R were ascertained after the last cold rolling operation and on completion of the age hardening that are listed in Table 4.

It becomes clear that the strengths and hardnesses of the strips of the working example A that have been cold-rolled and age-hardened at 300° C. are higher than the respective properties of the strips of the reference material R.

Favored by the high content of hard particles, over and above the temperature of about 400° C., recrystallization of the microstructure of alloy A takes place. This recrystallization leads to a drop in strength and in hardness, and so the effect of the precipitation hardening and spinodal segregation cannot be fully manifested. Since no recrystallization of the microstructure is observed for the reference material R up to 450° C., the values for $R_m$, $R_{p0.2}$ and for the hardness, particularly after age hardening at 400° C., are higher for the reference material R than for the working example A.

Figure 3:
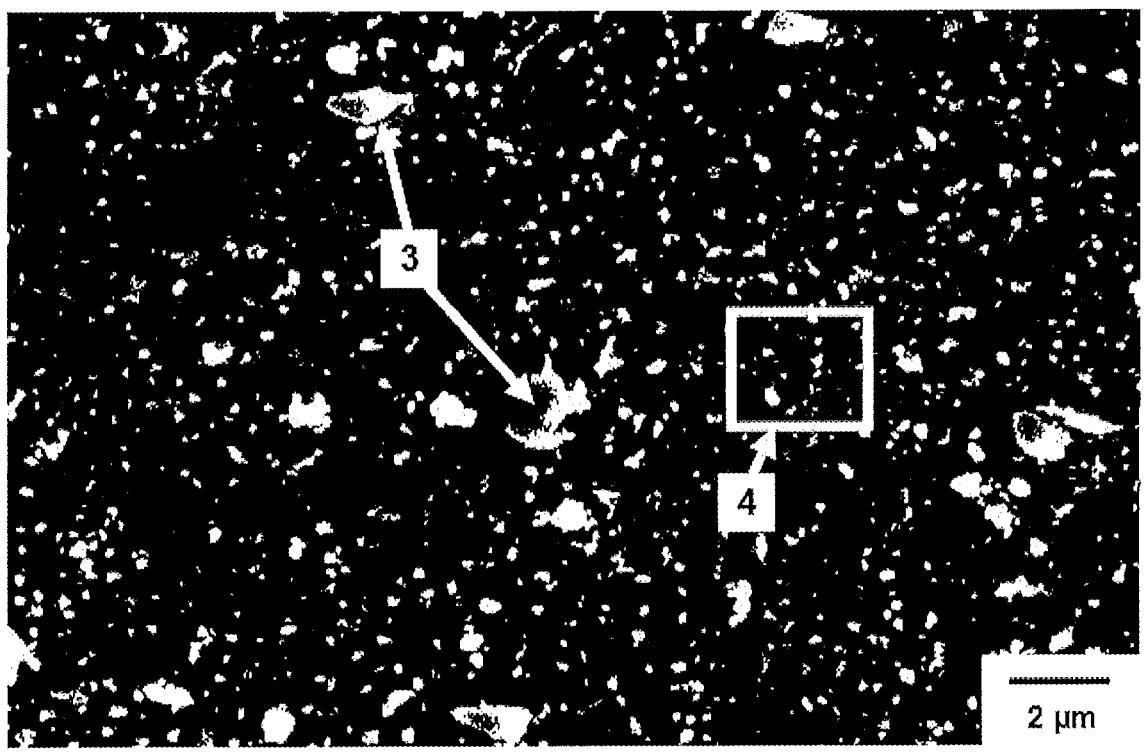
FIG. 3 shows hard particles of the second class and continuous precipitates of the (Cu, Ni)-Sn system in the microstructure of working example A.

The microstructure of the further-processed working example A, after age hardening at 450° C., includes the hard particles of the second class (labeled 3 in FIG. 3).

In addition, further phases have precipitated out in the microstructure of the further-processed alloy A. These include the continuous precipitates of the (Cu, Ni)—Sn system that are labeled 4 in FIG. 3, and the hard particles of the third class.

Figure 4:
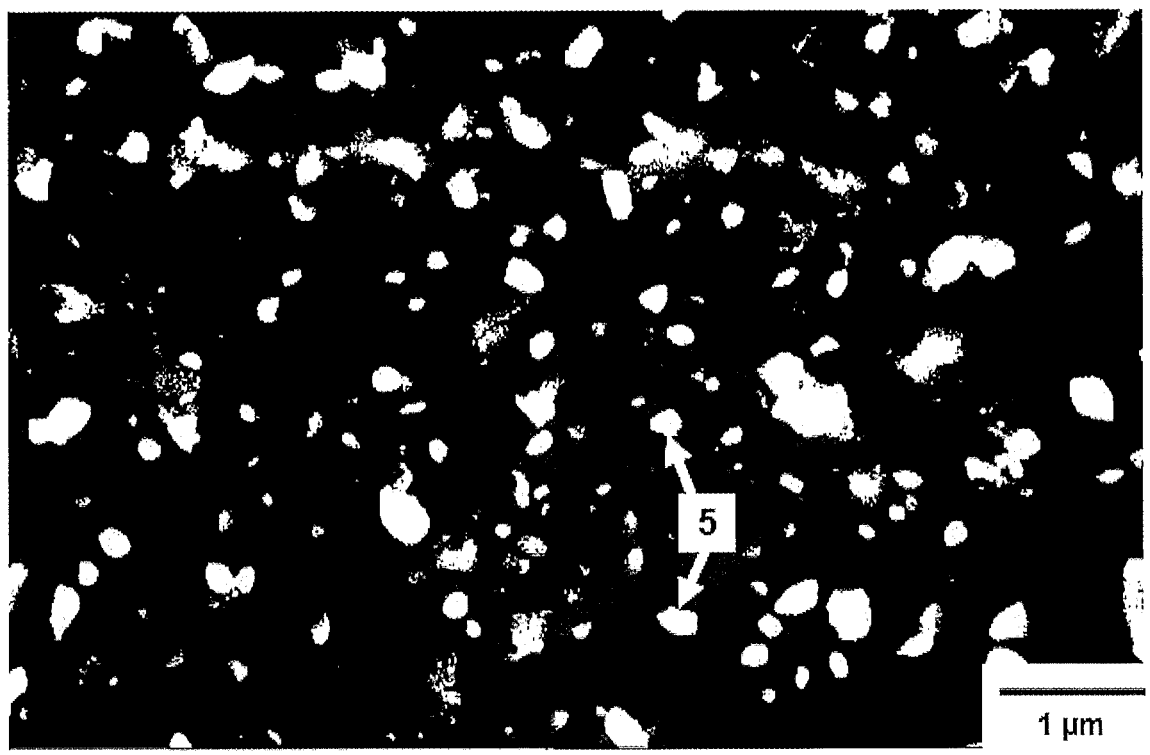
FIG. 4 shows hard particles of the third class in the microstructure of working example A.

The size of the hard particles of the third class of less than 3 μm is characteristic of the further-processed alloy of the invention. For the further-processed working example A of the invention, after age hardening at 450° C., it is actually less than 1 μm (labeled 5 in FIG. 4).

TABLE 4

Grain size, electrical conductivity and mechanical indices of the cold-rolled and age-hardened strips of the alloys A and R after undergoing the manufacturing program 1 (Table 3)

| Alloy | Age hardening [° C./h] | Grain size [μm] | Electrical conductivity [% IACS] | $R_m$ [MPa] | $R_{p0.2}$ [MPa] | A [%] | E [GPa] | Hardness HV1 |
|---|---|---|---|---|---|---|---|---|
| A | — | — | 10.0 | 992 | 948 | 3.1 | 110 | 313 |
|   | 300° C./4 h | — | 14.7 | 1025 | 980 | 4.0 | 126 | 328 |
|   | 400° C./3 h | ■2 | 24.3 | 784 | 718 | 12.8 | 145 | 260 |
|   | 450° C./3 h | <2 | 22.8 | 606 | 581 | 20.8 | 128 | 202 |
| R | — | — | 10.7 | 838 | 787 | 7.2 | 120 | 267 |
|   | 300° C./4 h | — | 13.8 | 910 | 874 | 9.2 | 118 | 297 |
|   | 400° C./3 h | — | 22.0 | 793 | 735 | 13.6 | 108 | 264 |
|   | 450° C./3 h | — | 23.2 | 610 | 508 | 23.0 | 124 | 195 |

■ = not yet fully recrystallized

In order to reduce the effect of the cold formability and the recrystallization temperature on the properties of the individual alloys, another manufacturing program was conducted. This manufacturing program 2 pursued the aim of processing the strand-cast plates of materials A and R by means of cold-forming and annealing operations to give strips, using identical parameters in each case for the degrees of cold forming and the annealing temperatures (Table 5).

Due to the high hardness of the cast state of the working example A, it was again calcined before the first cold rolling step at the temperature of 740° C. for the duration of 2 hours and subsequently cooled in an accelerated manner in water. As in the manufacturing program 1, this assimilated the properties of the cast state of A and R with regard to strength and hardness.

TABLE 5

Manufacturing program 2 for strips made from the strand-cast plates of the working example A and the reference material R

| No. | Manufacturing steps |
|---|---|
| 1 | Strand casting of plates of alloys A and R |
| 2 | Annealing of the cast plate of alloy A: 740° C./2 h + water quench |
| 3 | Cold rolling: from 9 to 6 mm ($\varepsilon$ = 33%, $\varphi$ = 0.4) |
| 4 | Annealing: 690° C./2 h + water quench |
| 5 | Cold rolling: from 6 to 3.5 mm ($\varepsilon$ = 42%, $\varphi$ = 0.5) |
| 6 | Annealing: 690° C./1 h + water quench |
| 7 | Cold rolling: from 3.5 to 3.0 mm ($\varepsilon$ = 14%, $\varphi$ = 0.15) |
| 8 | Age hardening: 400° C./3 h, 450° C./3 h, 500° C./3 h + air cooling |

After the last cold-rolling step to the final thickness of 3.0 mm, the strips of the working example A have the highest strength values and hardness values (Table 6).

Figure 2:

The age hardening operation at 400° C. for three hours, due to the spinodal segregation of the microstructure, the rise in the strengths $R_m$ (from 498 to 717 MPa) and $R_{p0.2}$ (from 439 to 649 MPa) and in the hardness HB (from 166 to 230 MPa) was at its clearest for the alloy R (Table 6). However, the microstructure of the age-hardened states of the alloy R is very inhomogeneous with a grain size between 5 and 30 µm. Moreover, the microstructure of the age-hardened states of the reference material R is marked by discontinuous precipitates of the (Cu, Ni)—Sn system (labeled 1 in FIG. 1 and FIG. 2). Also present in the microstructure of the further-processed state of the reference material R are Ni phosphides (labeled 2 in FIG. 1 and FIG. 2).

Figure 5:
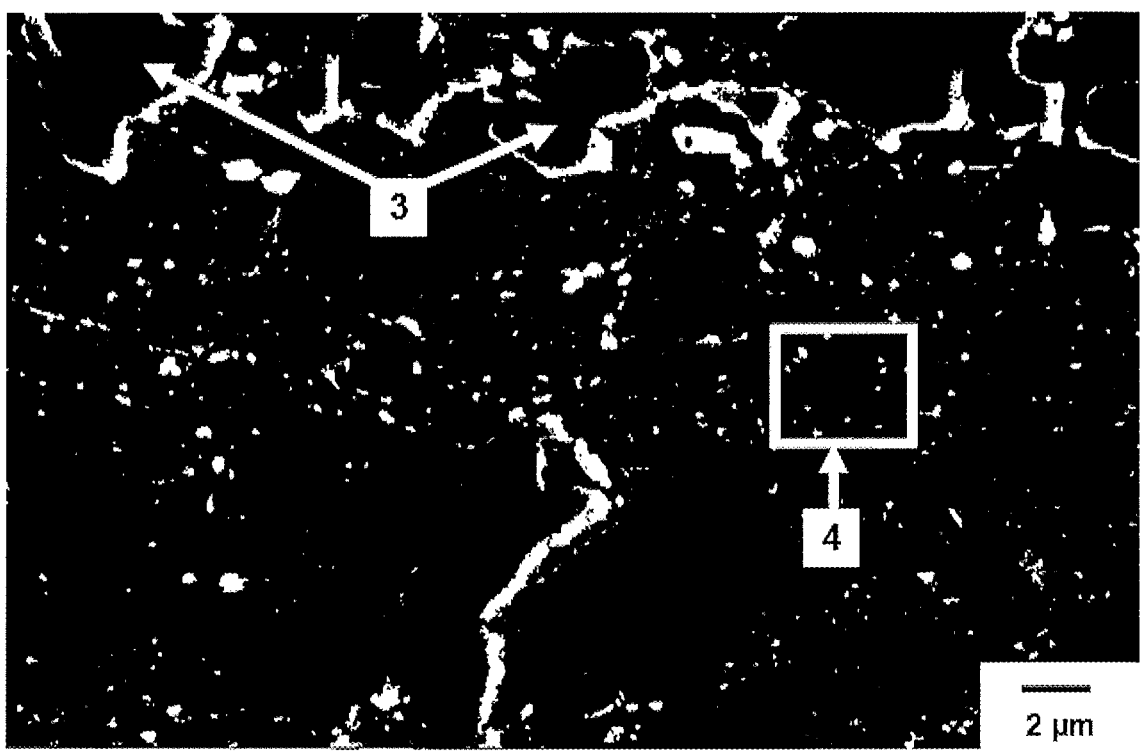
FIG. 5 shows hard particles of the second class and continuous precipitates of the (Cu, Ni)-Sn system in the microstructure of working example A.
Figure 6:
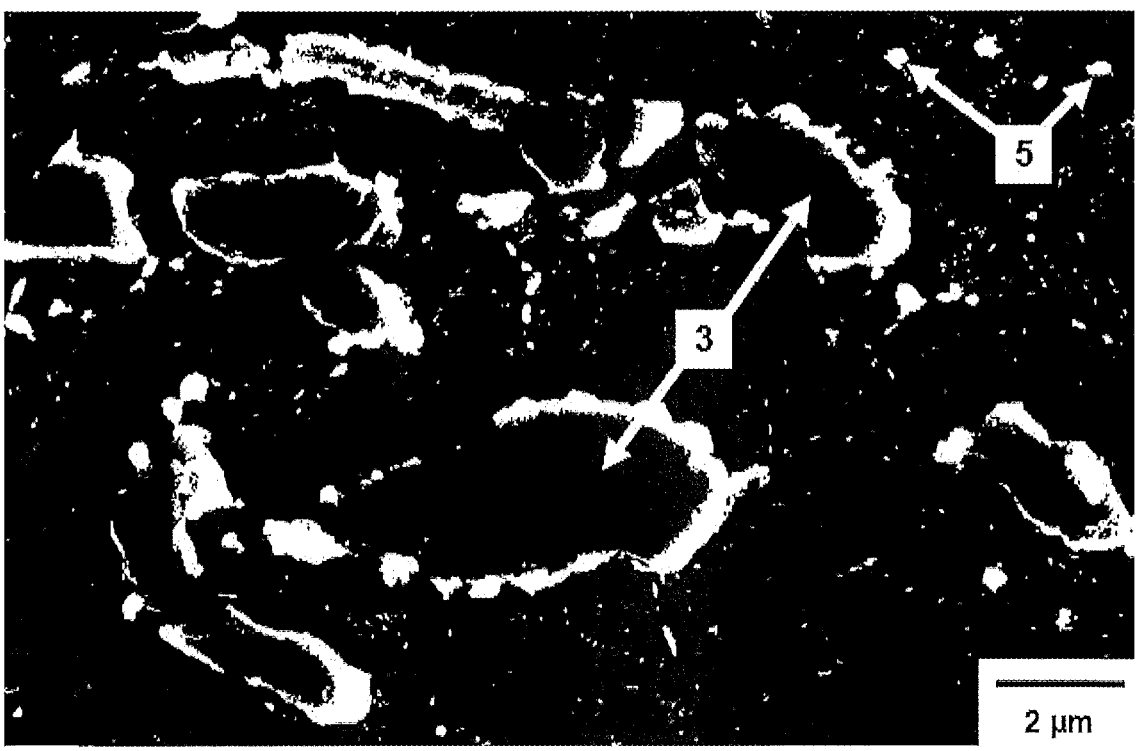
FIG. 6 shows hard particles of the second class and hard particles of the third class in the microstructure of working example A.

By contrast, the microstructure of the age-hardened strips of the working example A of the invention is very uniform with a grain size of 2 to 8 µm. Moreover, the structure of the working example A lacks the discontinuous precipitates even after age hardening at 450° C. for three hours followed by air cooling. By contrast, the hard particles of the second class are detectable in the microstructure. These phases are labeled 3 in FIG. 5 and FIG. 6.

In addition, further phases have precipitated out in the microstructure of the further-processed alloy A. These include the continuous precipitates of the (Cu, Ni)—Sn system labeled 4 in FIG. 5 and the hard particles of the third class. For the further-processed working example A of the invention, the size of the hard particles of the third class after age hardening at 450° C. is even less than 1 µm (labeled 5 in FIG. 6).

The strengths $R_m$ and $R_{p0.2}$ of the strips of the alloy A after age hardening at 400° C./3 h/air, due to the spinodal segregation of the microstructure, assume the values of 703 and 611 MPa. Thus, $R_m$ and $R_{p0.2}$ are lower than the indices of the correspondingly age-hardened state of the alloy R. The reason for this is that the working example A lacks the Ni content bound within the hard particles for the strength-increasing spinodal segregation of the microstructure. Should the strength level of the alloy R be a particular requirement, it is possible to add a higher proportion of the alloy element nickel to the alloy of the invention.

TABLE 7

Manufacturing program 3 for strips made from the strand-cast plates of the working example A and of the reference material R

| No. | Manufacturing steps |
|---|---|
| 1 | Strand casting of plates of alloys A and R |
| 2 | Hot rolling at 720° C. + water quench |
| 3 | Cold rolling of alloy A: from 9 to 6 mm ($\varepsilon$ = 33%, $\varphi$ = 0.4) |
| 4 | Annealing of alloy A: 690° C./2 h + water quench |
| 5 | Cold rolling of alloy A: from 6 to 3.5 mm ($\varepsilon$ = 42%, $\varphi$ = 0.5) |
| 6 | Annealing of alloy A: 690° C./1 h + water quench |
| 7 | Cold rolling of alloy A: from 3.5 to 3.0 mm ($\varepsilon$ = 14%, $\varphi$ = 0.15) |
| 8 | Age hardening of alloy A: 400° C./3 h, 450° C./3 h + air cooling |

During the hot rolling of the cast plates of the reference alloy R, deep heat cracks formed even after a few passes, which led to failure of the plates through fracture.

By contrast, the cast plates of the working example A of the invention were hot-rollable without damage and could be manufactured to the final thickness of 3.0 mm after multiple cold rolling and calcination processes. The properties of the age-hardened strips (Table 8) correspond largely to those of the strips that have been produced without hot forming by the manufacturing program 2 (Table 6).

Figure 7:
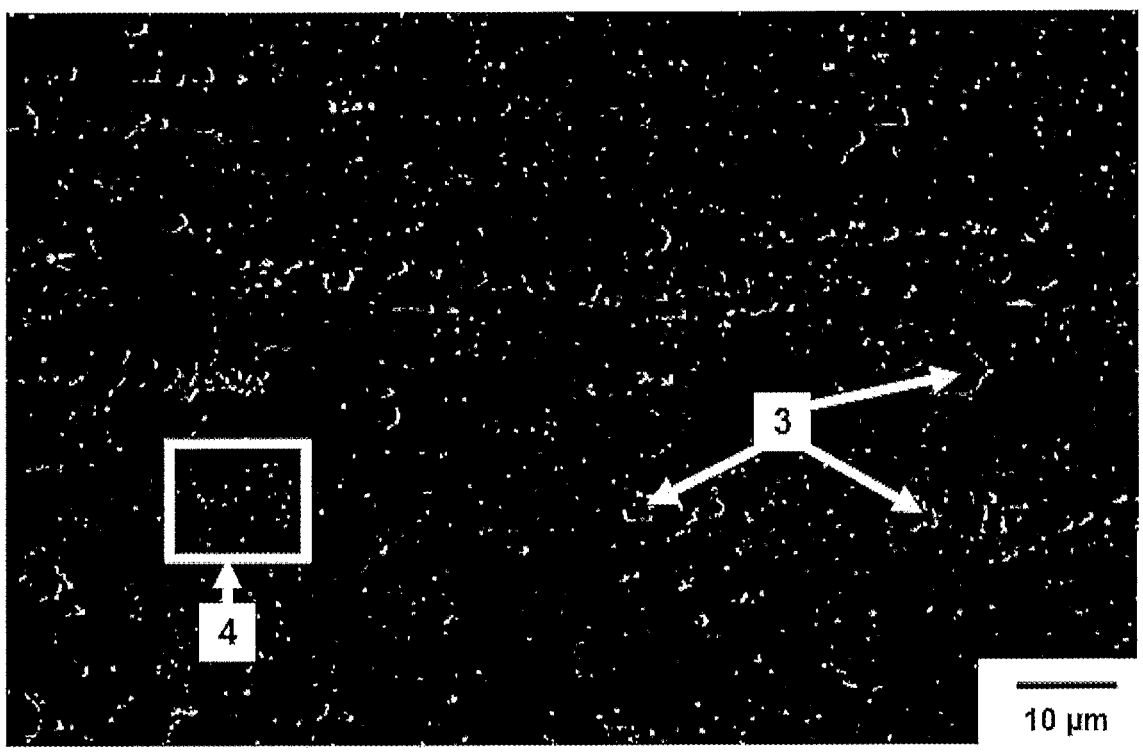
FIG. 7 shows hard particles of the second class and continuous precipitates of the (Cu, Ni)-Sn system in the microstructure of working example A.
Figure 8:
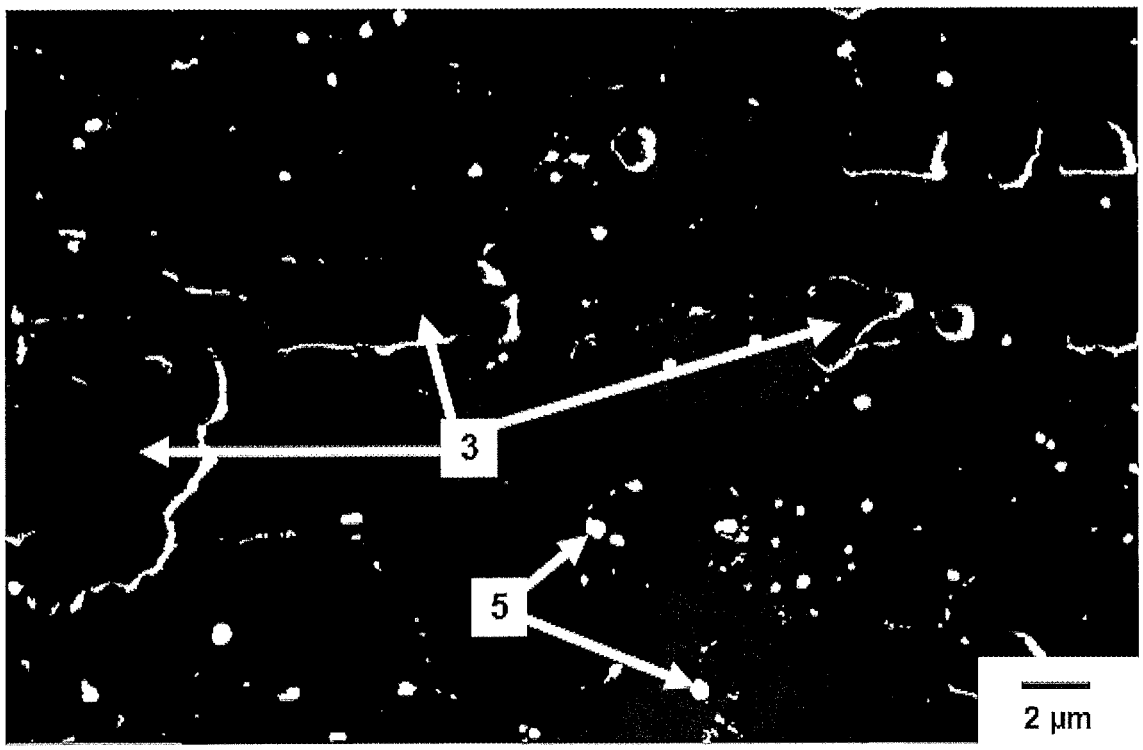
FIG. 8 shows hard particles of the second class and hard particles of the third class in the microstructure of a further-processed variant of working example A.

Also comparable is the microstructure of the strips made from the working example A of the alloy of the invention that were manufactured without and with a hot forming step. Thus, FIG. 7 and FIG. 8 show the uniform structure of the strips made from the working example A that were produced with a hot forming stage and a subsequent age hardening operation at 400° C./3 h/air cooling. In FIG. 7 and FIG. 8, the hard particles of the second class, labeled 3, are again apparent.

TABLE 6

Grain size, electrical conductivity and mechanical indices of the cold-rolled and age-hardened strips of the alloys A and R after undergoing the manufacturing program 2 (Table 5)

| Alloy | Age hardening [° C./h] | Grain size [µm] | Electrical conductivity [% IACS] | $R_m$ [MPa] | $R_{p0.2}$ [MPa] | A [%] | E [GPa] | Hardness HBW 1/30 |
|---|---|---|---|---|---|---|---|---|
| A | — | — | 11.2 | 559 | 500 | 23.4 | 109 | 190 |
|  | 400° C./3 h | 2-8 | 15.1 | 703 | 611 | 17.1 | 130 | 225 |
|  | 450° C./3 h | 2-8 | 16.7 | 673 | 526 | 18.4 | 124 | 210 |
|  | 500° C./3 h | 2-8 | 16.1 | 618 | 437 | 20.9 | 118 | 187 |
| R | — | — | 11.2 | 498 | 439 | 27.9 | 104 | 166 |
|  | 400° C./3 h | ■ 5-30 | 15.2 | 717 | 649 | 17.8 | 132 | 230 |
|  | 450° C./3 h | ■ 5-30 | 17.0 | 705 | 591 | 20.6 | 121 | 219 |
|  | 500° C./3 h | ■ 5-20 | 18.6 | 628 | 420 | 24.6 | 118 | 190 |

■ = inhomogeneous

The next step included the testing of the hot formability of the strand casting of the alloys A and R. For this purpose, the cast plates were hot-rolled at the temperature of 720° C. (Table 7). For the further processing steps of cold forming and intermediate annealing, the parameters of manufacturing program 2 were adopted.

In addition, FIG. 7 shows the continuous precipitates of the (Cu, Ni)—Sn system, labeled 4, and the hard particles of the third class. In the microstructure of the further-processed variant of the working example A, the hard particles of the third class actually assume a size of less than 1 µm (labeled 5 in FIG. 8).

The analysis of the hard particles of the second and third class in this further-processed state of working example A again revealed the compound $SiB_6$ as a representative of the Si-containing and B-containing phases, $Ni_6Si_2B$ as a representative of the Ni—Si borides, $Ni_3B$ as a representative of the Ni borides, FeB as a representative of the Fe borides, $Ni_3P$ as a representative of the Ni phosphides, $Fe_2P$ as a representative of the Fe phosphides, $Mg_3P_2$ as a representative of the Mg phosphides, $Ni_2Si$ as a representative of the Ni silicides, Fe-rich particles, to $Mg_2Si$ as a representative of the Mg silicides, and $Cu_4SnMg$ as a representative of the Cu-containing, Sn-containing and Mg-containing phases, which are present individually and/or as addition compounds and/or mixed compounds in the microstructure. In addition, these hard particles are ensheathed by precipitates of the (Cu, Ni)—Sn system.

TABLE 8

Grain size, electrical conductivity and mechanical indices of the cold-rolled and age-hardened strips of the alloy A after undergoing the manufacturing program 3 (Table 7)

| Alloy | Age hardening [° C./h] | Grain size [µm] | Electrical conductivity [% IACS] | $R_m$ [MPa] | $R_{p0.2}$ [MPa] | A [%] | E [GPa] | Hardness HBW 1/30 |
|---|---|---|---|---|---|---|---|---|
| A | — | — | 11.2 | 555 | 499 | 23.9 | 111 | 186 |
|   | 400° C./3 h | 3-10 | 15.1 | 696 | 612 | 19.5 | 125 | 224 |
|   | 450° C./3 h | 3-10 | 16.7 | 676 | 530 | 19.7 | 127 | 211 |

In the construction of installations, devices, engines and machinery, components having relatively high dimensions are required for numerous applications. For example, this is often the case in the field of slide bearings. Therefore, due to the limited producibility of infinitely large castings, it is necessary to establish the required material properties if at all possible by means of small degrees of cold forming as well.

Table 9 lists the process steps that are used in the course of the manufacturing program 4. The manufacturing operation was carried out with one cycle of cold forming and annealing operations. Again, only the cast plates of the alloy A were calcined prior to the first cold rolling operation at 740° C.

The first cold rolling operation on the cast plate of the alloy R and on the annealed cast plate of the alloy A was implemented with a degree of forming s of 16%. An annealing operation at 690° C. was followed by a cold rolling operation with s of 12%. Finally, age hardening of the strips took place at the temperatures of 350° C., 400° C. and 450° C.

TABLE 9

Manufacturing program 4

| No. | Manufacturing steps |
|---|---|
| 1 | Strand casting of plates of alloys A and R |
| 2 | Annealing of the cast plate of alloy A: 740° C./2 h + water quench |
| 3 | Cold rolling: from 9 to 7.6 mm ($\varepsilon$ = 16%, $\varphi$ = 0.17) |
| 4 | Annealing: 690° C./2 h + water quench |
| 5 | Cold rolling: from 7.6 to 6.7 mm ($\varepsilon$ = 12%, $\varphi$ = 0.126) |
| 6 | Age hardening: 350° C./3 h, 400° C./3 h, 450° C./3 h + air cooling |

The low degree of cold forming in the first cold rolling step of $\varepsilon$=16%, together with the subsequent annealing operation at 690° C., was insufficient to eliminate the dendritic and coarse-grain microstructure of the reference material R. Moreover, this thermomechanical treatment enhanced the coverage of the grain boundaries of the alloy R with Sn-rich segregations.

Across the dendritic structure and across the grain boundaries of R covered by Sn-rich segregations, cracks running from the surface deep into the interior of the strip formed during the second cold rolling step.

The crack-free and homogeneous microstructure of the strips of the working example A is characterized by the arrangement of the hard particles of the second and third class. Again, the hard particles of the third class have a size of less than 1 µm, even after this manufacturing program.

The resulting properties of the strips after the last cold rolling operation and after the age hardening operation are shown in Table 10. Due to the high density of cracks, it was not possible to take undamaged tensile samples from the strips of the alloy R. Thus, it was possible to undertake only the metallographic analysis and the measurement of hardness on these strips.

The working example A has a high degree of age hardenability which is manifested by the interaction of the mechanisms of precipitation hardening and spinodal segregation of the microstructure. Thus, there is a rise in the indices $R_m$ and $R_{p0.2}$ as a result of age hardening at 400° C. from 526 to 654 MPa and from 480 to 572 MPa.

TABLE 10

Grain size, electrical conductivity and mechanical indices of the cold-rolled and age-hardened strips of the alloys A and R after undergoing the manufacturing program 4 (Table 9)

| Alloy | Age hardening [° C./h] | Grain size [μm] | Electrical conductivity [% IACS] | $R_m$ [MPa] | $R_{p0.2}$ [MPa] | A [%] | E [GPa] | Hardness HBW 1/30 |
|---|---|---|---|---|---|---|---|---|
| A | — | — | 11.1 | 526 | 480 | 19.0 | 108 | 189 |
|   | 350° C./3 h | 20 | 13.2 | 645 | 555 | 16.1 | 107 | 218 |
|   | 400° C./3 h | 15-20 | 14.3 | 654 | 572 | 17.0 | 112 | 217 |
|   | 450° C./3 h | 20 | 16.0 | 648 | 477 | 18.8 | 108 | 203 |
| R | — | —■ | Not possible owing to formation of cracks! | | | | | 175 |
|   | 350° C./3 h | —■ | | | | | | 242 |
|   | 400° C./3 h | —■ | | | | | | 229 |
|   | 450° C./3 h | —■ | | | | | | 217 |

■ = dendritic, with Sn-rich segregations

As a result, it can be stated that, by means of the variation of the chemical composition, the degrees of forming for the cold forming operation(s) and the variation in the age hardening conditions, it is possible to adjust the degree of precipitation hardening and the degree of spinodal segregation of the microstructure of the invention to the required material properties. In this way, it is possible to bring the strength, hardness, ductility and electrical conductivity of the alloy of the invention into line with the field of use envisaged.

The invention claimed is:

1. A copper-nickel-tin alloy consisting of (in % by weight):
2.0% to 10.0% Ni,
2.0% to 10.0% Sn,
0.01% to 1.0% Fe,
0.01% to 0.8% Mg,
0.01% to 2.5% Zn,
0.01% to 1.5% Si,
0.002% to 0.45% B,
0.004% to 0.3% P,
optionally up to a maximum of 2.0% Co,
optionally up to a maximum of 0.25% Pb,
the balance being copper and unavoidable impurities,
wherein
the Si/B ratio of the element contents in % by weight of the elements silicon and boron is a minimum of 0.4 and a maximum of 8;
the copper-nickel-tin alloy includes Si-containing phases and B-containing phases and phases of the systems Ni—Si—B, Ni—B, Fe—B, Ni—P, Fe—P, Mg—P, Ni—Si, Mg—Si and further Fe-containing phases and Mg-containing phases that significantly improve the processing properties and use properties of the alloy.

2. The copper-nickel-tin alloy as claimed in claim 1, wherein the element iron is present at 0.02% to 0.6%.

3. The copper-nickel-tin alloy as claimed in claim 1, wherein the element magnesium is present at 0.05% to 0.6%.

4. The copper-nickel-tin alloy as claimed in claim 1, wherein the element zinc is present at 0.05% to 2.0%.

5. The copper-nickel-tin alloy as claimed in claim 1, wherein the element silicon is present at 0.05% to 2.0%0.9%.

6. The copper-nickel-tin alloy as claimed in claim 1, wherein the element boron is present at 0.01% to 0.4%.

7. The copper-nickel-tin alloy as claimed in claim 1, wherein the element phosphorus is present at 0.01% to 0.3%.

8. The copper-nickel-tin alloy as claimed in claim 1, wherein the alloy is free of lead apart from any unavoidable impurities.

9. A copper-nickel-tin alloy consisting of (in % by weight):
2.0% to 10.0% Ni,
2.0% to 10.0% Sn,
0.01% to 1.0% Fe,
0.01% to 0.8% Mg,
0.01% to 2.5% Zn,
0.01% to 1.5% Si,
0.002% to 0.45% B,
0.004% to 0.3% P,
optionally up to a maximum of 2.0% Co,
optionally up to a maximum of 0.25% Pb,
the balance being copper and unavoidable impurities,
wherein
the Si/B ratio of the element contents in % by weight of the elements silicon and boron is a minimum of 0.4 and a maximum of 8;
the following microstructure constituents are present in the alloy after casting:
a) an Si-containing and P-containing metallic base composition having, based on the overall microstructure,
a1) up to 30% by volume of first phase constituents that can be reported by the empirical formula $Cu_hNi_kSn_m$ and have an (h+k)/m ratio of the element contents in atomic % of 2 to 6,
a2) up to 20% by volume of second phase constituents that can be reported by the empirical formula $Cu_pNi_rSn_s$ and have a (p+r)/s ratio of the element contents in atomic % of 10 to 15 and
a3) a balance of a solid copper solution;
b) phases which, based on the overall microstructure, are present
b1) at 0.01% to 10% by volume as Si-containing and B-containing phases,
b2) at 1% to 15% by volume as Ni—Si borides having the empirical formula $Ni_xSi_2B$ with x=4 to 6,
b3) at 1% to 15% by volume as Ni borides,
b4) at 0.1% to 5% by volume as Fe borides,
b5) at 1% to 5% by volume as Ni phosphides,
b6) at 0.1% to 5% by volume as Fe phosphides,
b7) at 0.1% to 5% by volume as Mg phosphides,
b8) at 1% to 5% by volume as Ni silicides,
b9) at 0.1% to 5% by volume as Fe silicides and/or Fe-rich particles, b10) at 0.1% to 5% by volume as Mg silicides, and
b11) at 0.1% to 5% by volume as Cu-containing and Mg-containing phases and/or Cu-containing and Sn-containing and Mg-containing phases in the microstructure, which are present individually and/or as addition compounds and/or mixed compounds and are ensheathed by tin and/or the first phase constituents and/or the second phase constituents;
in the course of casting the Si-containing and B-containing phases in the form of silicon borides, the Ni—Si borides, Ni borides, Fe borides, Ni phosphides, Fe phosphides, Mg phosphides, Ni silicides, Fe silicides and/or Fe-rich particles, Mg silicides and the Cu-containing and Mg-containing phases and/or Cu-containing and Sn-containing and Mg-containing phases that are present individually and/or as addition compounds and/or mixed compounds constitute seeds for uniform crystallization during the solidification/cooling of the melt, such that the first phase constituents and/or the second phase constituents are distributed uniformly in the microstructure in the form of islands and/or in the form of a mesh;
the Si-containing and B-containing phases that are in the form of boron silicates and/or boron phosphorus silicates, together with phosphorus silicates and Mg oxides, assume the role of a wear-protecting and corrosion-protecting coating on semifinished materials and components of the alloy.

10. The copper-nickel-tin alloy as claimed in claim 9, wherein the element iron is present at 0.02% to 0.6%.

11. The copper-nickel-tin alloy as claimed in claim 9, wherein the element magnesium is present at 0.05% to 0.6%.

12. The copper-nickel-tin alloy as claimed in claim 9, wherein the element zinc is present at 0.05% to 2.0%.

13. The copper-nickel-tin alloy as claimed in claim 9, wherein the element silicon is present at 0.05% to 0.9%.

14. The copper-nickel-tin alloy as claimed in claim 9, wherein the element boron is present at 0.01% to 0.4%.

15. The copper-nickel-tin alloy as claimed in claim 9, wherein the element phosphorus is present at 0.01% to 0.3%.

16. The copper-nickel-tin alloy as claimed in claim 9, wherein the alloy is free of lead apart from any unavoidable impurities.

17. A copper-nickel-tin alloy consisting of (in % by weight):
2.0% to 10.0% Ni,
2.0% to 10.0% Sn,
0.01% to 1.0% Fe,
0.01% to 0.8% Mg,
0.01% to 2.5% Zn,
0.01% to 1.5% Si,
0.002% to 0.45% B,
0.004% to 0.3% P,
optionally up to a maximum of 2.0% Co,
optionally up to a maximum of 0.25% Pb,
the balance being copper and unavoidable impurities, wherein
the Si/B ratio of the element contents in % by weight of the elements silicon and boron is a minimum of 0.4 and a maximum of 8;
after further processing of the alloy by at least one annealing operation or by at least one hot forming operation and/or cold forming operation, as well as at least one annealing operation in the alloy, the following microstructure constituents are present:
A) a metallic base composition having, based on the overall microstructure,
A1) up to 15% by volume of first phase constituents that can be reported by the empirical formula $Cu_h Ni_k Sn_m$ and have an (h+k)/m ratio of the element contents in atomic % of 2 to 6,
A2) up to 10% by volume of second phase constituents that can be reported by the empirical formula $Cu_p Ni_r Sn_s$ and have a (p+r)/s ratio of the element contents in atomic % of 10 to 15 and
A3) a balance of a solid copper solution;
B) phases which, based on the overall microstructure, are present
B1) at 2% to 40% by volume as Si-containing and B-containing phases, Ni—Si borides having the empirical formula $Ni_x Si_2 B$ with x=4 to 6, as Ni borides, Fe borides, Ni phosphides, Fe phosphides, Mg phosphides, Ni silicides, Fe silicides and/or Fe-rich particles, Mg silicides and as Cu-containing and Mg-containing phases and/or Cu-containing and Sn-containing and Mg-containing phases in the microstructure, which are present individually and/or as addition compounds and/or mixed compounds and are ensheathed by precipitates of the (Cu, Ni)—Sn system,
B2) at up to 80% by volume as continuous precipitates of the (Cu, Ni)—Sn system in the microstructure,
B3) at 2% to 35% by volume as Ni phosphides, Fe phosphides, Mg phosphides, Ni silicides, Fe silicides and/or Fe-rich particles, Mg silicides and as Cu-containing and Mg-containing phases and/or Cu-containing and Sn-containing and Mg-containing phases in the microstructure that are present individually and/or as addition compounds and/or mixed compounds, are ensheathed by precipitates of the (Cu, Ni)—Sn system and have a size of less than 3 μm;
the Si-containing and B-containing phases that are in the form of silicon borides, the Ni—Si borides, Ni borides, Fe borides, Ni phosphides, Fe phosphides, Mg phosphides, Ni silicides, Fe silicides and/or Fe-rich particles, Mg silicides and the Cu-containing and Mg-containing phases and/or Cu-containing and Sn-containing and Mg-containing phases that are present individually and/or as addition compounds and/or mixed compounds constitute seeds for static and dynamic recrystallization of the microstructure during the further processing of the alloy, which enables the establishment of a uniform and fine-grain microstructure;
the Si-containing and B-containing phases that are in the form of boron silicates and/or boron phosphorus silicates, together with phosphorus silicates and Mg oxides, assume the role of a wear-protecting and corrosion-protecting coating on semifinished materials and components of the alloy.

18. The copper-nickel-tin alloy as claimed in claim 17, wherein the element iron is present at 0.02% to 0.6%.

19. The copper-nickel-tin alloy as claimed in claim 3, wherein the element magnesium is present at 0.05% to 0.6%.

20. The copper-nickel-tin alloy as claimed in claim 17, wherein the element zinc is present at 0.05% to 2.0%.

21. The copper-nickel-tin alloy as claimed in claim 17, wherein the element silicon is present at 0.05% to 0.9%.

22. The copper-nickel-tin alloy as claimed in claim 17, wherein the element boron is present at 0.01% to 0.4%.

23. The copper-nickel-tin alloy as claimed in claim 17, wherein the element phosphorus is present at 0.01% to 0.3%.

24. The copper-nickel-tin alloy as claimed in claim 17, wherein the alloy is free of lead apart from any unavoidable impurities.

\* \* \* \* \*

UNITED STATES PATENT AND TRADEMARK OFFICE
CERTIFICATE OF CORRECTION

PATENT NO. : 11,041,233 B2  
APPLICATION NO. : 16/309701  
DATED : June 22, 2021  
INVENTOR(S) : Kai Weber Page 1 of 1

It is certified that error appears in the above-identified patent and that said Letters Patent is hereby corrected as shown below:

On the Title Page

Item (30) is missing. Please add as follows:  
---(30) Foreign Application Priority Data  
Jul. 18, 2016 (DE).............10 2016 008 758.7---

In the Claims

Claim 5, Column 31, Line 63; change "2.0%0.9%" to ---0.9%---

Claim 19, Column 34, Line 55; change "as claimed in claim 3," to ---as claimed in claim 17,---

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*